(12) United States Patent
Ejima et al.

(10) Patent No.: US 8,145,039 B2
(45) Date of Patent: Mar. 27, 2012

(54) INFORMATION PROCESSING APPARATUS AND METHOD

(75) Inventors: Satoshi Ejima, Tokyo (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 1555 days.

(21) Appl. No.: 11/525,939

(22) Filed: Sep. 25, 2006

(65) Prior Publication Data
US 2007/0058936 A1  Mar. 15, 2007

Related U.S. Application Data

(63) Continuation of application No. 09/842,084, filed on Apr. 26, 2001, now abandoned, which is a continuation of application No. 08/972,679, filed on Nov. 18, 1997, now abandoned.

(60) Provisional application No. 60/052,923, filed on Jul. 11, 1997.

(30) Foreign Application Priority Data

Feb. 10, 1997  (JP) ........................................ 9-026513
Jun. 20, 1997  (JP) ........................................ 9-163898

(51) Int. Cl.
 *H04N 5/93*  (2006.01)
(52) U.S. Cl. ......................................... 386/280; 386/282
(58) Field of Classification Search ................... 386/280, 386/282
See application file for complete search history.

(56) References Cited

U.S. PATENT DOCUMENTS

| | | | |
|---|---|---|---|
| 4,675,755 A | 6/1987 | Baumeister et al. | |
| 5,237,648 A | 8/1993 | Mills et al. | |
| 5,367,510 A * | 11/1994 | Ando | 369/30.09 |
| 5,404,316 A | 4/1995 | Klingler et al. | |
| 5,436,878 A * | 7/1995 | Yamaguchi et al. | 369/47.1 |
| 5,477,337 A | 12/1995 | Schuler | |
| 5,513,306 A | 4/1996 | Mills et al. | |
| 5,574,569 A * | 11/1996 | Utsumi et al. | 386/248 |
| 5,579,239 A * | 11/1996 | Freeman et al. | 348/14.01 |
| 5,648,760 A | 7/1997 | Kumar | |
| 5,732,184 A * | 3/1998 | Chao et al. | 386/282 |
| 5,796,428 A * | 8/1998 | Matsumoto et al. | 348/207.99 |
| 5,812,736 A | 9/1998 | Anderson | |
| 5,930,446 A * | 7/1999 | Kanda | 386/282 |
| 5,974,386 A * | 10/1999 | Ejima et al. | 704/276 |

FOREIGN PATENT DOCUMENTS

JP  A-09-090973  4/1997

\* cited by examiner

*Primary Examiner* — Jamie Atala
(74) *Attorney, Agent, or Firm* — Oliff & Berridge, PLC

(57) ABSTRACT

An information processing method and apparatus reproduces predetermined information from a variety of information recorded by, for example, an electronic camera. The information may be reproduced in a predetermined order and with predetermined reproduction time. Reproduction information is generated based on recording information. Reproduction time may be changed by changing a WAIT time between reproduction of each recording unit. A slide show mode may be selected after a series of information are recorded. If information is not being presently recorded in the electronic camera, all of the information previously recorded may be displayed as the slide show. Also, new information may be recorded even under unexpected conditions. Information to be reproduced may be set during slide show mode by changing the order of reproduction if necessary. The new information is recognized as different information from the information that is set during the slide show mode.

38 Claims, 30 Drawing Sheets

2x2 PIXEL AREA

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

CCD 20

FIG. 7

3x3 PIXEL AREA

| a | b | c | a | b | c | a | b | c |
|---|---|---|---|---|---|---|---|---|
| d | e | f | d | e | f | d | e | f |
| g | h | i | g | h | i | g | h | i |
| a | b | c | a | b | c | a | b | c |
| d | e | f | d | e | f | d | e | f |
| g | h | i | g | h | i | g | h | i |

CCD 20

FIG. 8

| RECORDING ORDER | SHOOTING IMAGE NUMBER | MEMO NUMBER | SOUND NUMBER | CONTINUOUSLY PHOTOGRAPHED INFORMATION |

FIG. 15A

| REPRODUCTION ORDER | RECORDING ORDER | SHOOTING IMAGE NUMBER | MEMO NUMBER | SOUND NUMBER | CONTINUOUSLY PHOTOGRAPHED INFORMATION | WAIT |

FIG. 15B

INFORMATION PROCESSING APPARATUS AND METHOD

This is a continuation of application Ser. No. 09/842,084 filed Apr. 26, 2001, which in turn is a continuation of application Ser. No. 08/972,679 filed Nov. 18, 1997 (now abandoned), which claims the benefit of U.S. Provisional Application No. 60/052,923 filed Jul. 11, 1997. The disclosures of these prior applications are incorporated herein by reference in their entireties.

The disclosures of the following priority applications are herein incorporated by reference: Japanese Patent Application No. 9-026513, filed Feb. 10, 1997, and Japanese Patent Application No. 9-163898, filed Jun. 20, 1997.

BACKGROUND OF THE INVENTION

1. Field of Invention

The invention relates to an information processing apparatus. In particular, the invention relates to an information processing apparatus which reproduces or records information in recording units. The information in each recording unit includes at least one of image information of a photographed object, input memo information such as a line-drawing, and sound information input through a microphone.

2. Description of Related Art

In a conventional electronic camera, images are photographed and are reproduced. The images are reproduced at a predetermined time interval according to the order in which the images were recorded. As a result, a conventional electronic camera has a problem since the order of reproduction of the photographed images cannot be arbitrarily set. Also, there is another problem that the predetermined time interval for reproduction of each individual image cannot be arbitrarily set.

However, with progress in recent years concerning integration and mounting technology of semiconductor devices, electronic cameras capable of recording information such as sound and memos, in addition to images of objects, are developing. With such electronic cameras, simultaneous recording of various types of information is possible. As a result, the time wasted in reproducing unnecessary information could be reduced by selecting and reproducing only desired information. Such information is selected from among all the information that is recorded simultaneously. Such desired information might include image information, for example. However, conventional electronic cameras do not provide such capability. As a result, it is impossible to selectively reproduce information arbitrarily.

Another problem with the conventional electronic camera is that it may be necessary for the user to make a presentation using photographed images, i.e. "necessary" images to the presentation. This may be accomplished, for example, by connecting an electronic camera to a large CRT monitor, for example. However the user might shoot a new image for some reason, after shooting the necessary images using the electronic camera. However, the newly photographed image will then be reproduced along with the "necessary" images of the presentation. This results in reproduction of unrelated images.

SUMMARY OF THE INVENTION

In view of the problems described above, it is an object of the invention to provide the capability to selectively reproduce desired information and to vary the reproduction time of each information. It is also an object of the invention to provide the capability to reproduce information recorded by an electronic camera, for example, in a desired order.

In accordance with the invention, an information processing apparatus includes a memory for storing recording units. A recording unit selection unit is provided for selecting a recording unit for reproduction, from among all the recording units stored in the memory. A reproduction order setting unit sets the reproduction order of the plurality of recording units which are selected by the recording unit selection unit. A reproduction time setting unit sets the reproduction time for each of the recording units, which are set by the reproduction order setting unit. A reading unit reads the recording unit from the memory based on the order set by the reproduction order setting unit. A reproduction unit reproduces information contained in the recording unit which is read by the reading unit based on the set reproduction time for that recording unit. The reproduction time is set by the reproduction time setting unit.

According to another aspect of the invention, it is a further object of the invention to prevent the unnecessary reproduction of an image even when a new image is photographed after recording necessary images. Such attribute is useful when making a presentation using an electronic camera, for example.

According to this further aspect of the invention, the information processing apparatus includes a generation unit for generating a reproduction group including at least one recording unit, a setting unit for setting the reproduction order of each recording unit contained in the reproduction group, a designation unit for designating a desired reproduction group, and a reproduction unit for reproducing recording units, based on the reproduction order set by the setting unit. Each recording unit contained in the designated reproduction group is reproduced. A prohibition unit prohibits the reproduction of recording units which are not contained in the reproduction group designated by the designation unit.

The invention also relates to methods of controlling information processing apparatus as detailed above and to a recording medium that stores a computer-readable control program including instructions that are executable by a controller of an information processing apparatus to function as detailed above.

BRIEF DESCRIPTION OF THE DRAWINGS

These and other aspects and advantages of the invention will become apparent from the following detailed description of preferred embodiments when taken in conjunction with the accompanying drawings, in which like reference numerals designate like elements and wherein:

FIG. 7 shows a thinning process of pixels during L mode in accordance with the invention;

FIG. 8 shows a thinning process of pixels during H mode in accordance with the invention;

FIGS. 15(a)-(b) show examples of data structures of recording information and reproduction information, respectively, in accordance with the invention;

DETAILED DESCRIPTION OF PREFERRED EMBODIMENTS

Figure 1:
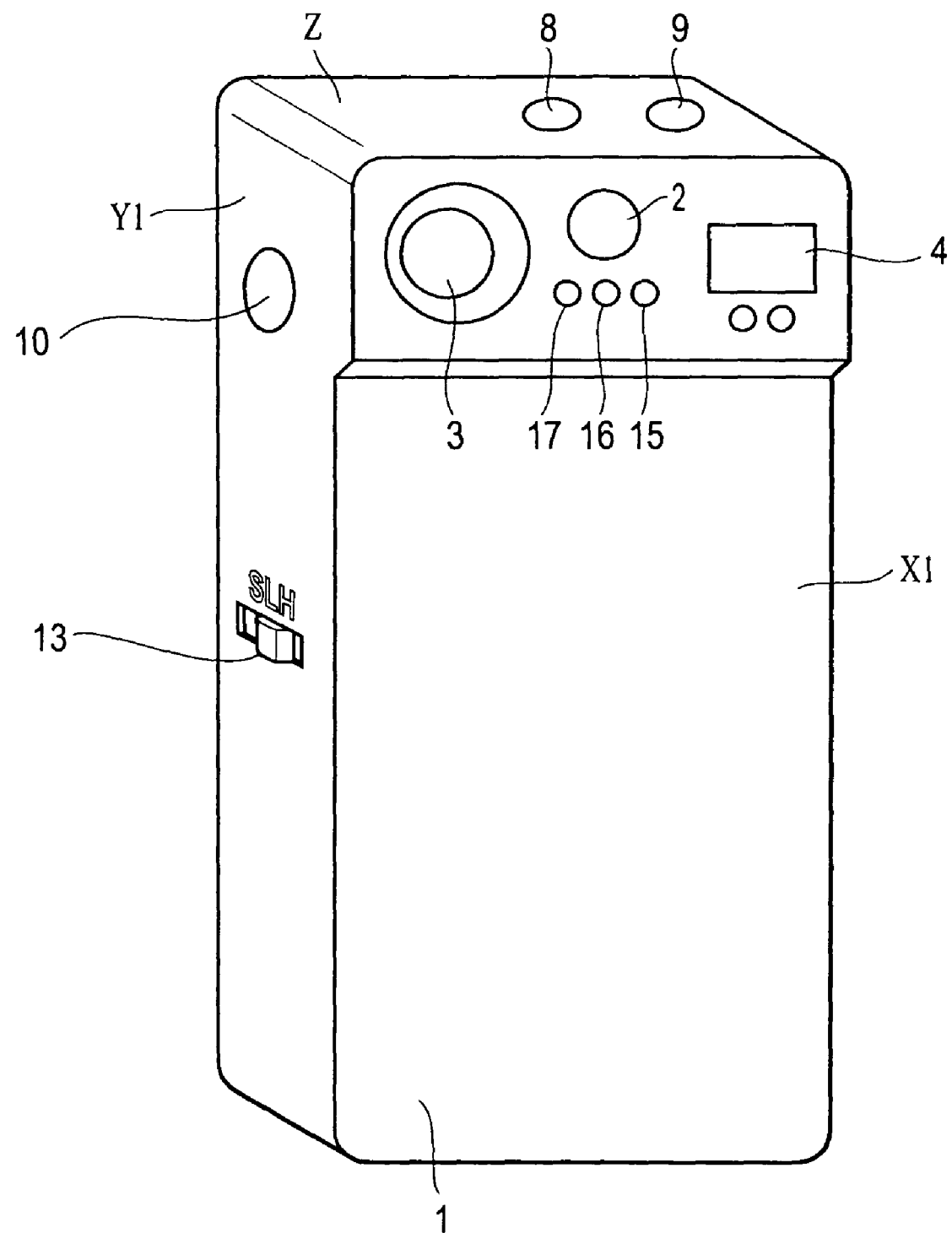
FIG. 1 is a front perspective view of an electronic camera in accordance with a first embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate like elements.

Figure 2:
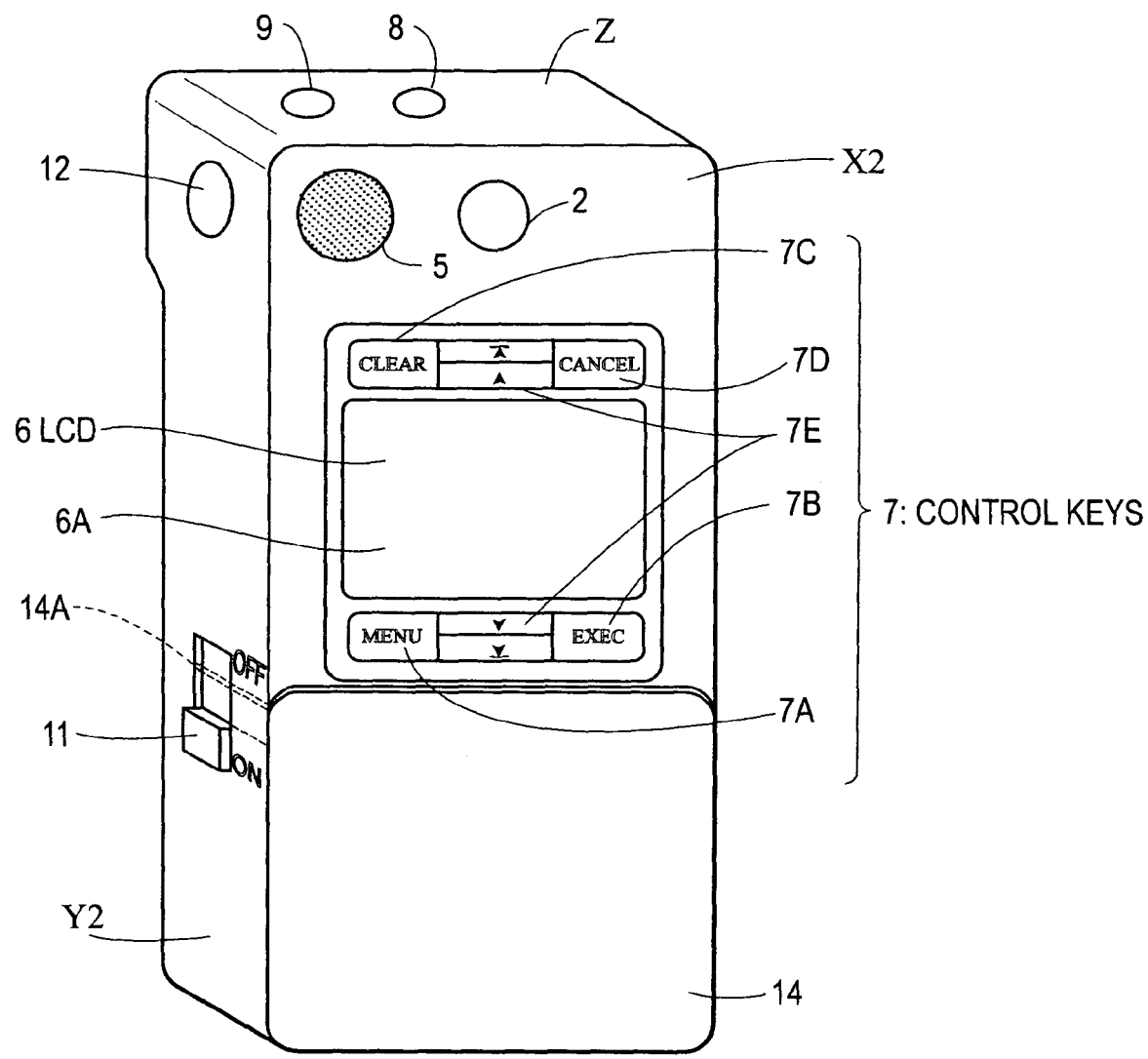
FIG. 2 is a back perspective view of the electronic camera shown in FIG. 1.

FIGS. 1 and 2 are perspective views showing examples of an arrangement of an embodiment of an electronic camera in accordance with the invention. In the electronic camera of the embodiment of the invention, the surface facing the object is defined as the X1 face and the surface facing the user when an object is photographed is defined as the X2 face. On the top edge portion of the X1 face are positioned a viewfinder 2, which is used to verify the shooting range of the object, and a shooting lens 3, which takes in the optical image of the object. A light emitting unit 4, i.e. a strobe which emits light to illuminate an object, is also provided on the top edge portion of the X1 face.

Figure 4:
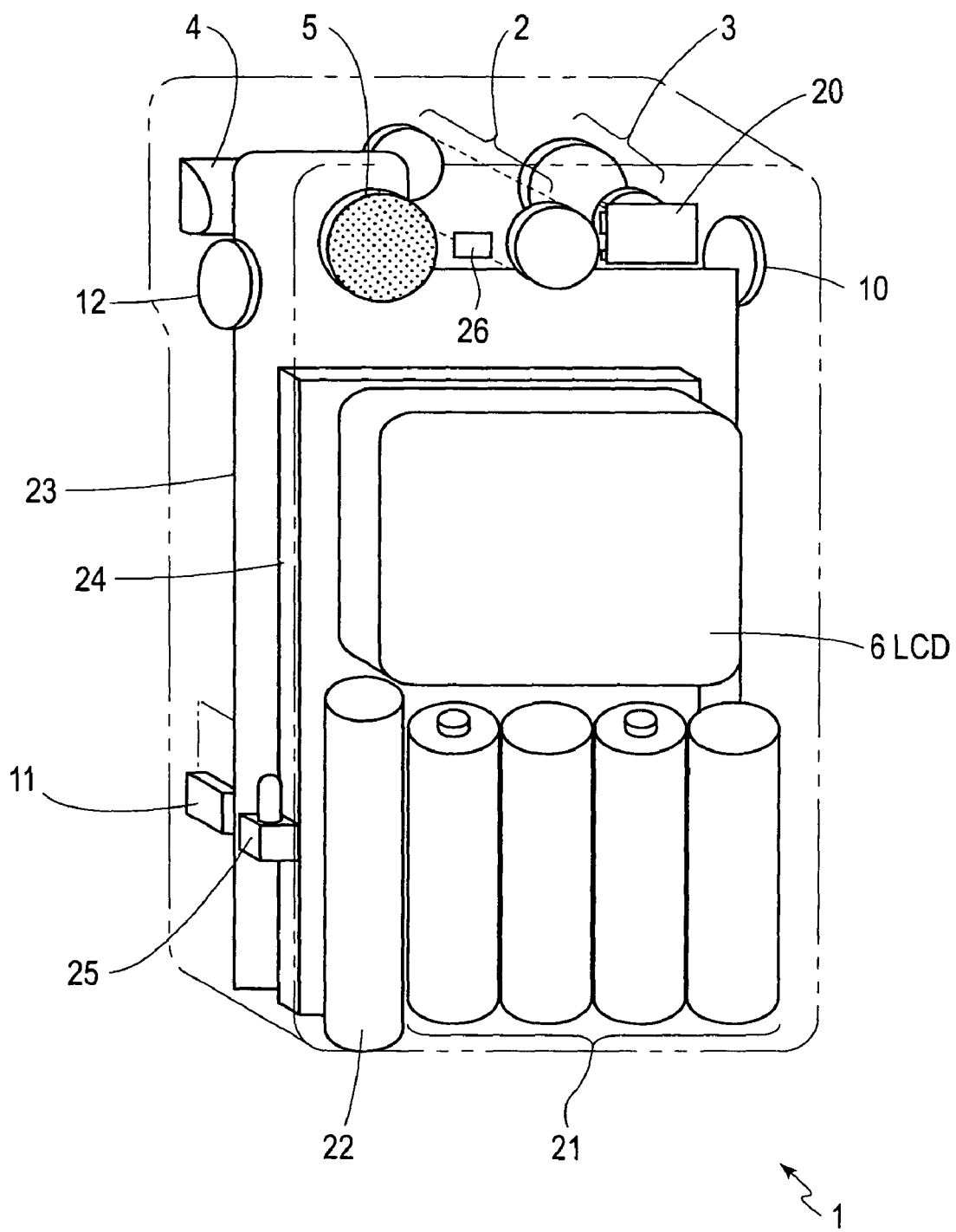
FIG. 4 is a perspective view showing the interior of electronic camera shown in FIG. 1 and FIG. 2.

Also, a photometry device 16 is located on the X1 face and measures light during operation of a red-eye reducing LED 15 to reduce red eye by emitting light before causing the strobe 4 to emit light. CCD 20, as shown in FIG. 4, is stopped during photometry when the strobe 4 emits light. A colorimetry device 17 measures color temperature during the time when operation of CCD 20 is stopped.

Additionally, a top portion of the X2 face corresponds to the top portion of the X1 face, on which the viewfinder 2, the control lens 3 and the light emitting unit 4 are formed. The viewfinder 2 and a speaker 5, which outputs sound recorded in the electronic camera 1, are provided on the X2 face. Also, the LCD 6 and the operation keys 7 are provided on the X2 face, and are positioned vertically below the viewfinder 2, the shooting lens 3, the light emitting unit 4 and the speaker 5. On the surface of the LCD 6, a touch tablet 6A is arranged. The touch tablet 6A outputs position data corresponding to the position designated by a touching operation using a pen type pointing device, explained hereinafter. The touch tablet 6A is made of transparent material such as glass or resin. The user may view an image displayed on the LCD 6, which is formed beneath the touch tablet 6A, through the touch tablet 6A.

The control keys 7 are operated to reproduce and display recorded data on the LCD 6. Using the control keys, the user inputs control commands to the CPU 39, which in turn controls the recording unit selection unit, the reproduction order setting unit, the reproduction time setting unit, the reading unit, the information selection unit, the alteration unit, and frame selection unit, to be described below.

The menu key 7A is operated to display the menu screen on the LCD 6. An execution key 7B is operated to reproduce recorded information selected by the user. A clear key 7C is operated to delete recorded information. A cancel key 7D is operated to interrupt the reproduction process of recorded information. The scroll key 7E is operated to scroll the screen vertically when recorded information is displayed on LCD 6 as a table.

Figure 3:
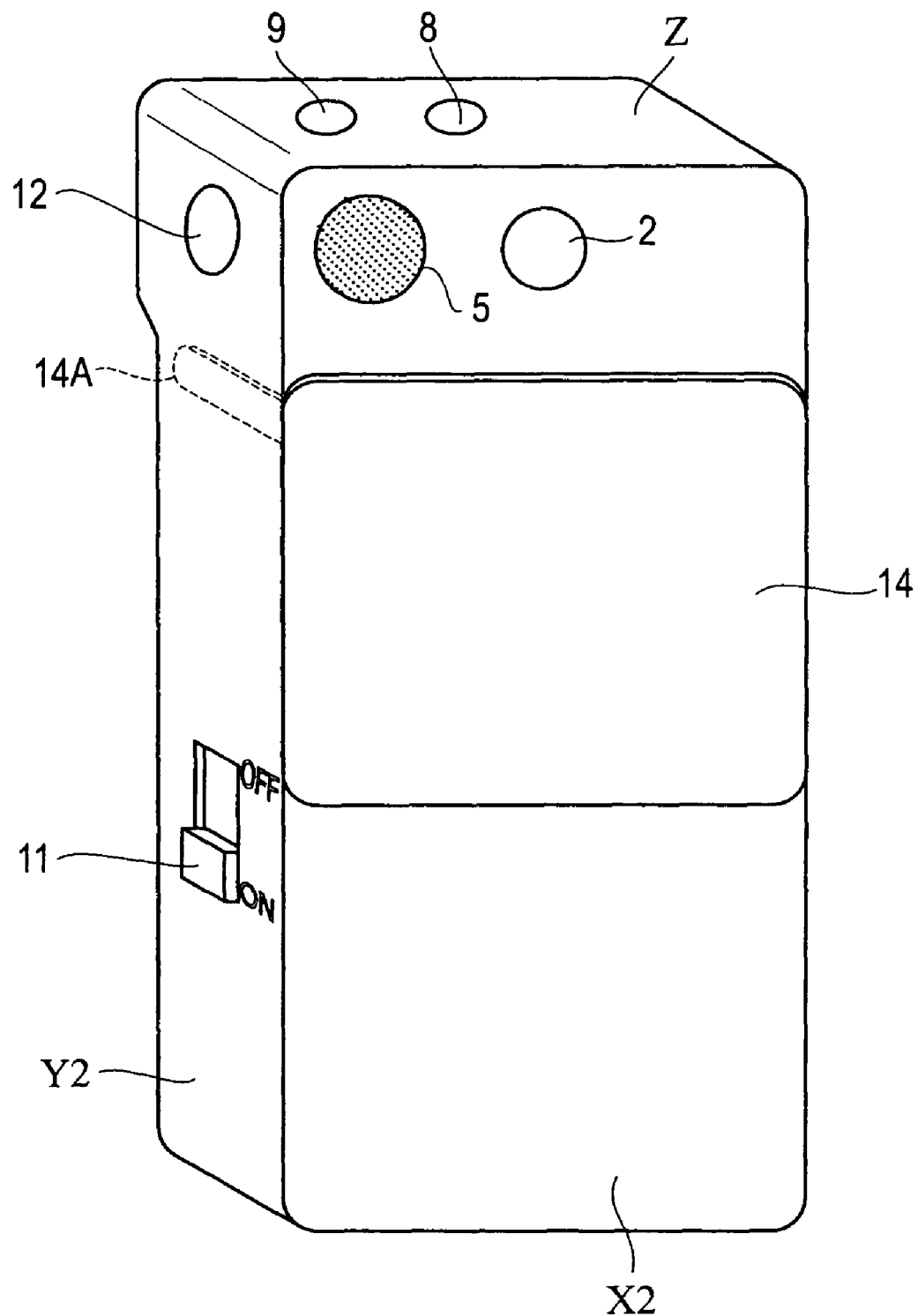
FIG. 3 is a back perspective view of the electronic camera with the LCD cover closed in accordance with the invention.

An LCD cover 14 is provided on the X2 face to freely slide over and protect the LCD 6 when it is not in use. When moved vertically upward, the LCD cover 14 covers the LCD 6 and touch tablet 6A as shown in FIG. 3. When the LCD cover is moved vertically downward, the LCD 6 and the touch tablet 6A are exposed. Also, a power switch 11, described below, is arranged on the Y2 face, as shown in FIG. 2, and is switched to an ON position by an arm member 14A of the LCD cover 14.

A microphone 8 to collect sound and an earphone jack 9, to which an earphone may be connected (not shown), are provided on the Z face. The Z face is the top surface of the electronic camera 1. A release switch 10, which is operated to photograph an object, and a continuous shooting mode switch 13, which is operated to switch to a continuous shooting mode, is provided on the left side surface as shown in FIG. 1, i.e. the Y1 face. The release switch 10 and the continuous shooting mode switch 13 are arranged vertically below the viewfinder 2, the shooting lens 3 and the light emitting unit 4, which are provided in the top edge section of the X1 face.

A recording switch 12, operated to record sound, and a power switch 11 are provided on the left surface as shown in FIG. 2, i.e. the Y2 face. The Y2 faces opposite the Y1 face. Similar to the release switch 10 and the continuous shooting mode switch 13 described above, the recording switch 12 and the power switch 11 are arranged vertically below the viewfinder 2, the shooting lens 3 and the light emitting unit 4, which are provided on the top edge portion of the X1 face. Additionally, the recording switch 12 and the release switch 10, on the Y1 face, are formed at essentially the same height. As a result, a user does not feel any difference when the camera is either held in the right hand or the left hand.

The height of the recording switch 12 and the release switch 10 may be varied to prevent erroneous pressing of a switch arranged on an opposite side of a switch intended to be pressed. That is, erroneous pressing can result when one switch is pressed and the user's fingers holding the opposite side surface, to offset the pressing force of the switch, inadvertently presses a switch.

The continuous shooting mode switch 13 is used when the user decides whether to shoot one frame or several frames of an object when the release switch 10 is pressed. For example, if the indicator of the continuous shooting mode switch 13 is positioned at "S", i.e. when the switch is changed to the S mode, and the release switch 10 is pressed, the camera shoots only one frame.

Additionally, if the indicator of the continuous shooting mode switch 13 is positioned at "L", i.e. when the switch is changed to the L mode, and the release switch 10 is pressed, the camera shoots eight frames per second for as long as the release switch 10 is pressed. Specifically, the low speed continuous shooting mode is enabled.

Further, if the indicator of the continuous shooting mode switch 13 is positioned at "H", i.e. when the switch is changed to the H mode, and the release switch 10 is pressed, the camera shoots 30 frames per second as long as the release switch 10 is pressed. Specifically, the high speed continuous shooting mode is enabled.

A description of the internal components of the electronic camera 1 is set forth below. FIG. 4 is a perspective view showing an example of the internal components of the electronic camera shown in FIG. 1 and FIG. 2. The CCD 20 is provided adjacent the X2 face behind the shooting lens 3. The optical image of an object imaged through the shooting lens 3 is photoelectrically converted to electric (image) signals by the CCD 20.

The display device 26 in the viewfinder is arranged inside the vision screen of the viewfinder 2. The display device 26 displays conditions of the camera including settings, for example, of various functions for the user who views an object through the viewfinder 2. Four cylindrical batteries 21, for example AA dry cell batteries, are placed side by side vertically below the LCD 6. Electric power stored in the batteries 21 is supplied to components of the camera. Additionally, a condenser 22 is provided below the LCD 6 and next to the batteries 21 to accumulate electric charge used to cause the light emitting unit 4 to flash.

Various control circuits are formed on the circuit board 23 to control each part of the electronic camera 1. Also, a removable memory card 24 is provided between the circuit board 23, the LCD 6 and the batteries 21. As a result, various information input into the electronic camera 1 is recorded in a preassigned area of the memory card 24.

Figure 5A:
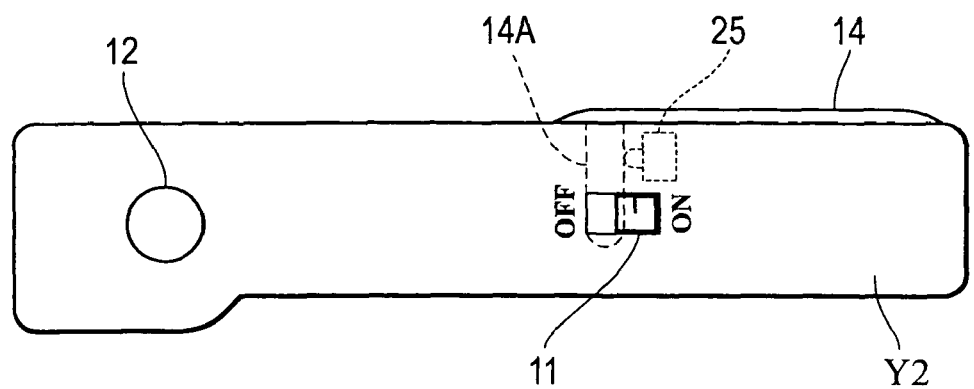
FIGS. 5(a)-(c) show a relationship between the position of the LCD cover, the power source switch and the LCD switch in accordance with the invention.

The LCD switch 25, arranged adjacent to the power source switch 11, is turned on only when a plunger thereof is pressed. The LCD switch 25 is switched to the ON-state, in conjunction with the power source switch 11, by an arm member 14A mounted on the LCD cover 14 when the LCD cover 14 is moved vertically downward as shown in FIG. 5(a).

Figure 5B:
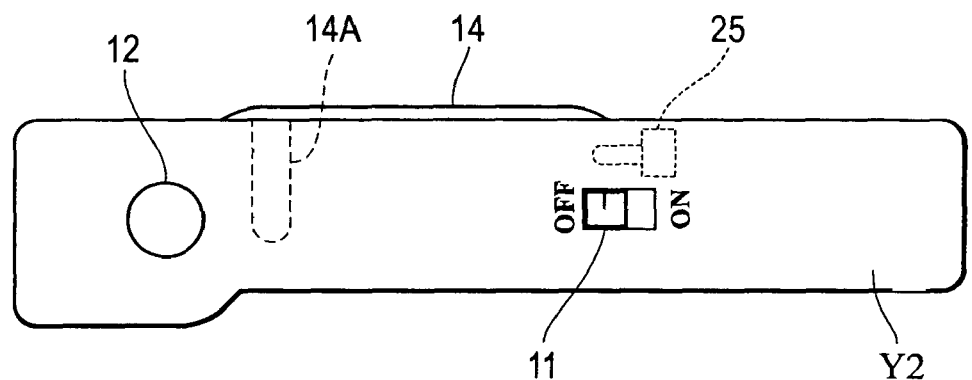
Figure 5C:
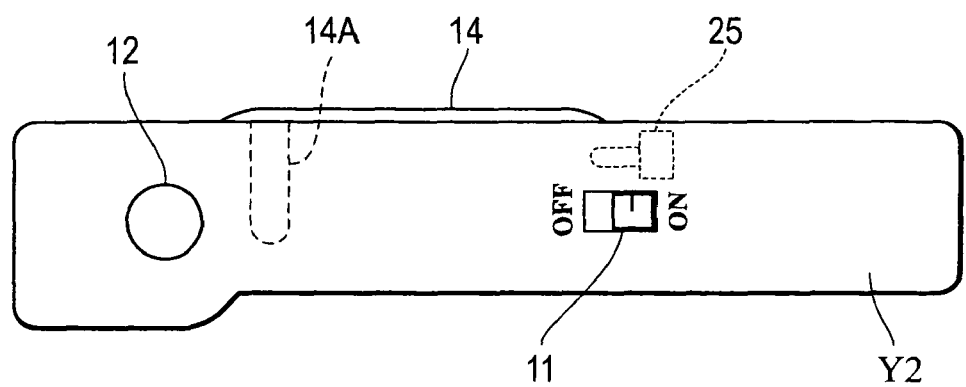

Also, if the LCD cover 14 is moved vertically upward, the power source switch 11 may be operated by the user independently of the LCD switch 25. For example, if the LCD cover 14 is closed and the electronic camera 1 is not used, the power source switch 11 and the LCD switch 25 are positioned in OFF mode as shown in FIG. 5(b). In this mode, if the user switches the power source switch 11 to ON mode as shown in FIG. 5(c), the power source switch 11 will be positioned in the ON mode, but the LCD switch 25 will continue to be in the OFF mode. Alternatively, the power source switch 11 and the LCD switch 25 may be positioned in the OFF mode, as shown in FIG. 5(b). In this condition, if the LCD cover 14 is opened, the power source switch 11 and the LCD switch 25 will be moved to the ON mode, as shown in FIG. 5(a). Then, when the LCD cover 14 is closed, only the LCD switch 25 will move to the OFF mode as, shown in FIG. 5(c).

With the arrangement of the present embodiment, the memory card 24 is constructed to be removable. However, a memory in which various information can be recorded may also be provided on the circuit board 23. Also, various information recorded on the memory, for example the memory card 24, may be output to an external personal computer, for example, using an interface 48.

Figure 6:
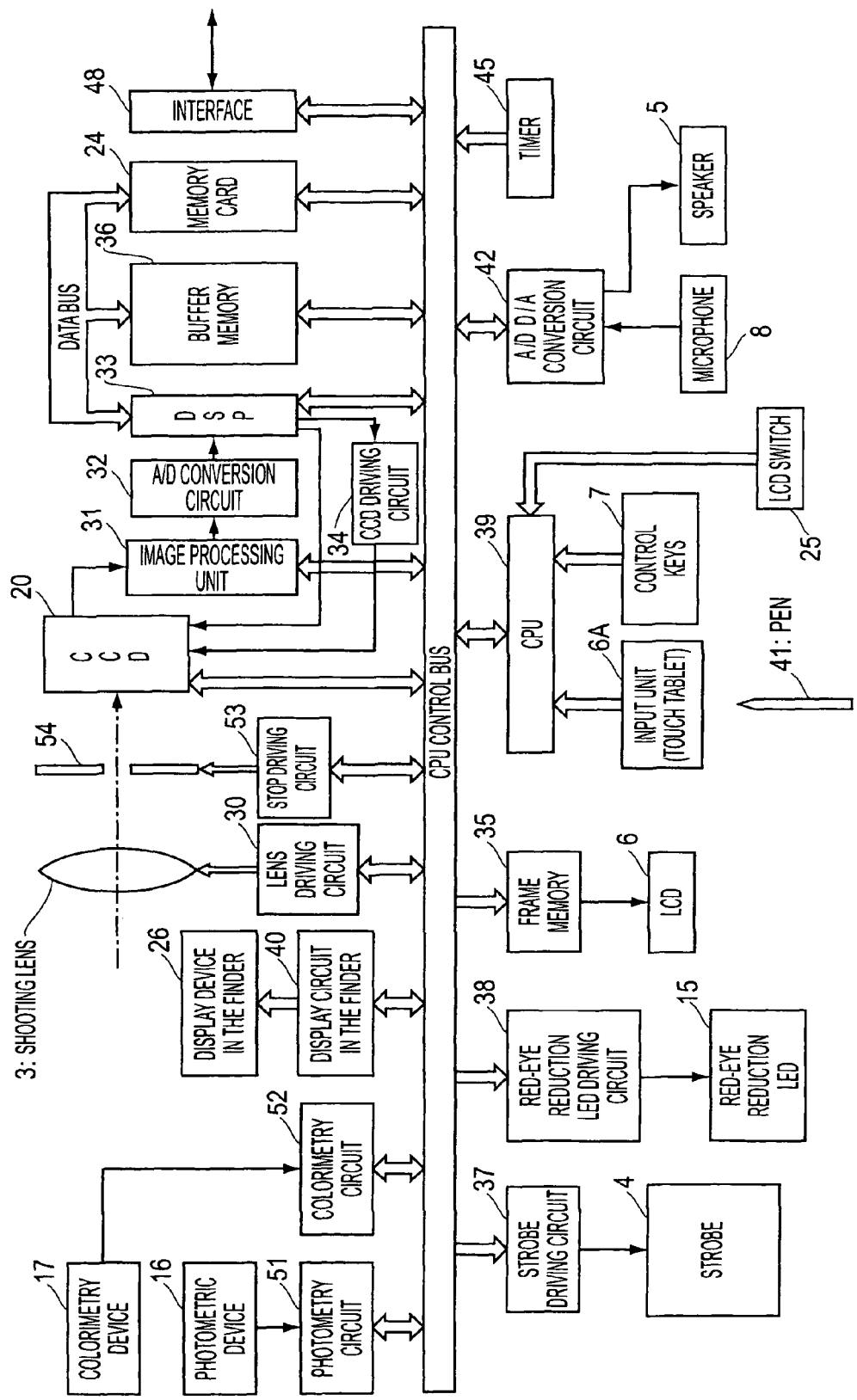
FIG. 6 is a block diagram of the electronic camera shown in FIG. 1 and FIG. 2.

The internal electronic components of the electronic camera 1 of the present embodiment are further described hereinafter, with reference to the block diagram of FIG. 6. The CCD 20, which includes a plurality of pixels, photoelectrically converts an optical image formed on each pixel into an electric (image) signal. The digital signal processor, a reproduction unit hereinafter referred to as the DSP 33, supplies a CCD horizontal driving pulse to the CCD 20. The DSP 33 also controls the CCD driving circuit 34 so as to supply a CCD vertical driving pulse to the CCD 20.

The image processing unit 31 is controlled by the CPU 39 so as to sample image signals photoelectrically converted by the CCD 20 with predetermined timing, and to amplify the sampled signals to a predetermined level. The analog/digital conversion circuit, hereinafter referred to as the A/D conversion circuit 32, digitizes image signals sampled by the image processing unit 31 and supplies them to the DSP 33.

The DSP 33 controls the buffer memory 36 and the data bus connected to the memory card 24 in such a manner so as to temporarily store the image data, which is supplied from the A/D conversion circuit 32, in the buffer memory 36; to read the image data stored in the buffer memory 36; and to record the image data in the memory card 24. Also, the DSP 33 controls the frame memory 35 so as to store image data which is supplied by the A/D conversion circuit 32. Further, the DSP 33 causes the image data to be displayed on LCD 6, inputs the shooting image data from the memory card 24, decompresses the shooting image data, and then stores the decompressed shooting image data in the frame memory 35, and thereafter displays the decompressed shooting image data on the LCD 6.

Also, the DSP 33 repeatedly operates the CCD 20 by adjusting the exposure time, i.e. the exposure value, until the exposure level of CCD 20 reaches an appropriate level. Then, the electronic camera 1 initiates further operations. Thereafter, the DSP 33 first operates the photometry circuit 51 and then computes an initial value of exposure time of the CCD 20. Such exposure time corresponds to the level of light detected by the photometry device 16. As a result, adjustment of the exposure time for the CCD 20 may be accomplished in a short period of time.

In addition, the DSP 33 executes time management for data input/output when recording on the memory card 24 and when storing decompressed image data on the buffer memory 36. The buffer memory 36 is used to accommodate the difference between the data input/output speed of the memory card 24 and the CPU 39 and the DSP 33 processing speeds.

The microphone 8 inputs sound information, i.e. gathers sound and outputs the sound information to the A/D and D/A conversion circuit 42. The A/D and D/A conversion circuit 42 converts the analog signals to digital signals and then outputs the digital signals to the CPU 39. As a result, sound data supplied by the CPU 39 is changed to analog signals. The sound signal, which has been changed to analog signals, is output to the speaker 5.

The photometry device 16 measures the level of light of an object to be photographed and its surroundings. The results of the measurement are output to the photometry circuit 51. The photometry circuit 51 executes a predetermined operation on the analog signals. Specifically, the measurement results, input from the photometry device 16, are converted to digital signals. The digital signals are output to the CPU 39.

The color measuring (colorimetry) device 17 measures the color temperature of the object and its surroundings. The results of the measurement are output to the colorimetry circuit 52. The colorimetry circuit 52 executes a predetermined operation on the analog signals. Specifically, the color measurement results input from the colorimetry device 17 are converted to digital signals. The digital signals are output to the CPU 39.

The timer 45 has an internal clock circuit which outputs data corresponding to current time (time and date) to the CPU 39.

The stop driving circuit 53 sets the diameter of the aperture stop 54 to a predetermined value. The stop 54 is arranged between the shooting lens 3 and the CCD 20 and changes the size of the aperture depending on the level of light passing from the shooting lens 3 to the CCD 20. The CPU 39 stops operation of the photometry circuit 51 and the colorimetry circuit 52 when the LCD cover 14 is open, and performs operation of the photometry circuit 51 and the colorimetry circuit 52 when the LCD cover 14 is closed. The CPU also stops operation of the CCD 20, for example, the electronic shutter operation, until the release switch 10 is positioned in half-depressed mode, i.e. the state in which a first control process is executed.

The CPU 39 receives results of light measurement from the photometry device 16, and also receives the color measurement results of the colorimetry device 17. This is accomplished by the CPU controlling the photometry circuit 51 and the colorimetry circuit 52 when operation of the CCD 20 is stopped.

Also, the CPU 39 is made to compute a white balance adjustment value corresponding to the color temperature supplied from the colorimetry circuit 52. This computation is done using a predetermined table. The white balance value is supplied to the image processing unit 31. More specifically, when the LCD cover 14 is closed, the LCD 6 is not used as an electronic viewfinder. As a result, operation of the CCD 20 is stopped. The CCD 20 consumes a large amount of electrical power. However, by stopping operation of the CCD 20 as described above, the power of the batteries 21 may be conserved.

Also, when the LCD cover 14 is closed, the image processing unit 31 is controlled in such a manner that various processes are not executed by the image processing unit 31 until the release switch 10 is operated, specifically, until the release switch 10 is positioned in the half-depressed mode.

Also, when the LCD cover 14 is closed, the stop driving circuit 53 is controlled in such a manner that the stop driving circuit 53 does not execute certain operations until the release switch 10 is operated, i.e. until the release switch 10 is positioned in the half-depressed mode. Such operations may include, for example, changing the diameter of the aperture stop 54.

Additionally, at the user's discretion, the CPU 39 causes the strobe 4 to flash. This is done by controlling the strobe driving circuit 37. Also at the user's discretion, the CPU 39 causes the red eye reduction LED 15 to flash prior to causing the strobe 4 to flash by controlling the red eye reduction LED driving circuit 38. In such situation, the CPU 39 prevents the strobe 4 from flashing when the LCD cover 14 is open, i.e. when the electronic viewfinder is used. In such manner, an object may be photographed while an image is displayed on the electronic viewfinder.

The CPU 39 records information concerning the date of shooting as image data header information. Such information is stored in the shooting image recording area of memory card 24 based on the date data input from the timer 45. In other words, shooting date data is attached to shooting image data recorded in the shooting image recording area of memory card 24. Additionally, the CPU 39 temporarily records, digitizes and compresses sound data to the buffer memory 36. The CPU then records the sound data in the sound recording area of the memory card 24. Also, data concerning the recording date is simultaneously recorded in the sound recording area of the memory card 24 as sound data header information.

The CPU 39 executes an auto focus operation by controlling the lens driving circuit 30 and by moving the shooting lens 3. Also, the CPU changes the aperture diameter of the stop 54 by controlling the stop driving circuit 53. Stop 54 is arranged between the shooting lens 3 and the CCD 20. The CPU 39 displays settings of various operations, for example, on the display device 26 inside the viewfinder 2. Such display is accomplished by the CPU controlling the display circuit 40 inside the viewfinder 2.

The CPU 39 may exchange predetermined data with a predetermined external apparatus (not shown) using an interface (I/F) 48. Also, the CPU 39 receives signals from the control keys 7 and processes such signals appropriately. Also, a position on the touch tablet 6A may be pressed by the pen 41, i.e. a pen type pointing member. As a result, the user may operate the recording unit selection unit, the reproduction order setting unit, the reproduction time setting unit, the information selection unit, the alteration unit, and the frame selection unit, to be described below.

To input a memo (line drawing data), the CPU 39 inputs the X-Y coordinates of the position of the touch tablet 6A being pressed. The CPU accumulates the coordinate data in the buffer memory 36. Additionally, the CPU 39 records line drawing information, which is accumulated in the buffer memory 36, in the line drawing information recording area of the memory card 24 together with header information. The header information includes line drawing information input date.

Next, various operations of the electronic camera 1 in accordance with the present embodiment will be explained. First, operation of the electronic viewfinder in the LCD 6 in accordance with the present apparatus will be described.

When the user half-depresses the release switch 10, the DSP 33 determines whether the LCD cover 14 is open. This determination is based on the value of a signal input from the CPU 39 indicative of the status of the LCD switch 25. If the LCD cover 14 is determined to be closed, operation of the electronic viewfinder is not executed. In this case, the DSP 33 stops the process until the release switch 10 is operated.

Also, if the LCD cover 14 is closed, the operation of the electronic viewfinder is not executed. As a result, the CPU 39 stops operation of the CCD 20, the image processing unit 31 and the stop driving circuit 53. Additionally, the CPU 39 causes the operation of the photometry circuit 51 and the colorimetry circuit 52 when stopping the CCD 20. In addition, the CPU supplies the measurement results to the image processing unit 31. The image processing unit 31 uses the values of the measurement results to control the white balance and the brightness value. Also, if the release switch 10 is operated, the CPU 39 operates the CCD 20 and the stop driving circuit 53.

Alternatively, if the LCD cover 14 is open, the CCD 20 executes the electronic shutter operation using a predetermined exposure time for each predetermined time interval and executes photoelectric conversion of the image of the object. The image is input by the shooting lens 3. The CCD then outputs the resulting image signals to the image processing unit 31. The image processing unit 31 controls the white balance and brightness value and executes a predetermined process on the image signals. The image processing unit 31 then outputs the image signals to the A/D conversion circuit 32. Under these circumstances, if the CCD 20 is operating, the image processing unit 31 uses an adjusted value. The adjusted value is computed by the CPU and is based on the output from the CCD 20. The adjusted value is used for controlling white balance and brightness values.

Further, the A/D conversion circuit 32 converts the image signal, an analog signal, into image data, which is a digital signal. The A/D conversion circuit 32 then outputs the image data to the DSP 33. The DSP 33 outputs the image data to the frame memory 35 and causes the LCD 6 to display an image corresponding to the image data. In this manner, in the electronic camera 1, the CCD 20 operates the electronic shutter at a predetermined time interval when the LCD cover 14 is open. Also, the CCD 20 executes operation of the electronic viewfinder by periodically converting the signal output from CCD 20 into image data. The CCD 20 then outputs the image data to the frame memory 35 and continuously displays the image of the object on LCD 6.

If the LCD cover 14 is closed as described above, electronic viewfinder operation is not executed. Also, operation of CCD 20, the image processing unit 31, and the stop driving circuit 53 are stopped to conserve energy.

Hereinafter, shooting of an object using the present apparatus is described. First, the continuous shooting mode switch 13, provided on the Y1 face may be switched to the S-mode, i.e. the mode in which only one frame is photographed. This mode will now be explained. First, power is introduced into the electronic camera 1 by switching the power source switch 11 shown in FIG. 11 to the "ON" position. The process of shooting an object begins when the release switch 10, provided on the Y1 face is pressed. This is done after verifying the object with the viewfinder 2. Then, if the LCD cover 14 is closed, the CPU 39 resumes operation of the CCD 20, the image processing unit 31 and the stop driving circuit 53 when the release switch 10 is in half-depressed status. The process of shooting the object is started by the CPU when the release switch 10 reaches the fully depressed status, i.e. the state in which a second control process is executed.

The image of the object being observed through the viewfinder 2 is input by the shooting lens 3 and forms an image on the CCD 20, which has a plurality of pixels. The image formed on the CCD 20 is photoelectrically converted into an image signal by each pixel, and is sampled by the image processing unit 31. The image signal which is sampled by the image processing unit 31 is output to the A/D conversion circuit 32 where it is digitized. Then, the signal is output to the DSP 33.

The DSP 33, after outputting the image temporarily to the buffer memory 36, reads the image data from the buffer memory 36 and compresses the image data using the JPEG (joint photographic experts group) method. This method is a combination of discrete cosine transformation, quantization, and Huffman encoding. The DSP 33 then records the image data in the shooting image recording area of memory card 24. Then, the shooting date data is recorded in the shooting image recording area of memory card 24 as header information of shooting image data.

If the continuous shooting mode switch 13 is switched to the S-mode, only one frame is photographed. Further shooting does not take place even if the release switch 10 remains pressed. Also, if the release switch 10 is continuously pressed, the photographed image is displayed on the LCD when the LCD cover 14 is open.

Further, when the continuous shooting mode switch 13 is switched to the L-mode, 8 frames per second are continuously photographed. In this case, power is introduced into the electronic camera 1 by switching the power source switch 11 to the "ON" position. The process of shooting an object begins when the release switch 10, provided on the Y1 face, is pressed. If the LCD cover 14 is closed, the CPU 39 starts operation of the CCD 20, the image processing unit 31 and the stop driving circuit 53 when the release switch 10 is in half-depressed status. The CPU begins the shooting process of the object when the release switch 10 reaches the fully depressed position.

The photographed image of the object being observed through the viewfinder 2 is collected by the shooting lens 3 and forms an image on the CCD 20. The photo image formed on the CCD 20 is photoelectrically converted into an image signal by each pixel, and is sampled by the image processing unit 31 at a rate of 8 times per second. Further, the image processing unit 31 ignores or thins out three-fourths of the pixels of the (electrical) image signals of all of the pixels in the CCD 20.

To explain, the image processing unit 31, as shown in FIG. 7, divides the pixels in the CCD 20 into areas composed of 2×2 pixel areas, i.e. 4 pixels. The image signal of one pixel, which is arranged on a predetermined location in each area, is sampled and the remaining 3 pixels are thinned out or ignored. For example, at the time of the first sampling (the first frame), pixel a located on the left upper corner is sampled, and the other pixels b, c and d are thinned out or ignored. At the time of the second sampling (the second frame), the pixel b located on the right upper corner is sampled, and the other pixels a, c and d are ignored. Likewise, during the third and the fourth sampling, pixels c and d, which are respectively located at the left lower corner and the right lower corner are sampled, and the rest are thinned out. Thus, each pixel is selected for sampling once every four frames.

The image signals, i.e. the image signals of one-fourth of all the pixels in the CCD 20 that are sampled by the image processing unit 31, are supplied to the A/D conversion circuit 32. At the A/D conversion circuit 32, the image signals are digitized and output to the DSP 33.

The DSP 33 outputs the image temporarily to the buffer memory 36. The DSP 33 then reads the image data from the buffer memory 36, compresses the image data using the JPEG method, and records the digitized and compressed shooting image data in the shooting image area of the memory card 24. At this time, the shooting date data is recorded in the shooting image area of the memory card 24 as the header information of shooting image data.

Thirdly, when the continuous shooting mode switch 13 is switched to the H-mode, 30 frames per second are photographed. Power is introduced into the electronic camera 1 by switching the power source switch 11 to the "ON" position. The process of shooting an object begins when release switch 10, provided on the Y1 face, is pressed. In this case, if the LCD cover 14 is closed, the CPU 39 starts operation of the CCD 20, the image processing unit 31 and the stop driving circuit 53 when the release switch 10 is in the half-depressed position. The CPU 39 begins the shooting process of the object when the release switch 10 is moved to the fully depressed position.

The optical image of the object observed through the viewfinder 2 is collected by the shooting lens 3 and is imaged onto the CCD 20. The optical image of the object, imaged onto the CCD 20, is photoelectrically converted to an image signal by each pixel and is sampled at a rate of 30 times per second by the image processing unit 31. At this time, the image processing unit 31 thins out or ignores eight-ninths of the pixels producing electrical image signals among all the pixels in the CCD 20.

In other words, the image processing unit 31 divides the pixels in the CCD 20, which are arranged in a matrix, into areas including 3×3 pixels, i.e., 9 pixels, as shown in FIG. 8. Further, the image processing unit 31 samples, at a rate of 30 times per second, the image signal of one pixel arranged in a predetermined position in each area. The remaining 8 pixels are ignored or thinned out. For example with reference to FIG. 8, at the time of the first sampling (the first frame), pixel a, which is located on the left upper corner of each area, is sampled. The other pixels b through i are ignored. During the second sampling (the second frame), the pixel b, located on the right of a, is sampled, and other pixels a and c through i are ignored. Likewise, during the third, the fourth and each subsequent sampling, the pixel c, the pixel d, etc. are sampled, respectively, and the rest are ignored. Thus, each pixel is sampled once every nine frames.

The image signals that are sampled by the image processing unit 31, i.e. the image signals of one-ninth of all the pixels in CCD 20, are output to the A/D conversion circuit 32 where they are digitized and output to the DSP 33. The DSP 33 outputs the image temporarily to the buffer memory 36. The DSP then reads the image data, compresses the image data using the JPEG method, and records the digitized and compressed image shooting data to the shooting image recording area of the memory card 24.

In this situation, the object may be illuminated, if necessary, by operating the strobe 4. However, when the LCD cover 14 is open, or when the LCD 6 executes the electronic viewfinder operation, the CPU 39 prevents the strobe 4 from flashing.

The operation in which two dimensional information, i.e. pen input information, is input using the touch tablet 6A is described hereinafter. When the touch tablet 6A is pressed by the tip of pen 41, the X-Y coordinates of the contact point is input to the CPU 39. These X-Y coordinates are stored in the buffer memory 36. The CPU 39 writes address data to the frame memory 35. The address data corresponds to each point of the X-Y coordinates. Then, a line drawing corresponding to contact points of the pen 41 is displayed on X-Y coordinates in the LCD 6.

As described above, since the touch tablet 6A is formed of transparent material, the user is able to view points that are displayed on the LCD 6, i.e. the points being pressed by the tip of the pen 41. Thus, it appears that input is made by the pen directly onto the LCD 6. Further, when the pen 41 is moved on the touch tablet 6A, a line tracing the motion of the pen 41 is displayed on the LCD 6. Also, if the pen 41 is moved intermittently on the touch tablet 6A, a dotted line, tracing the motion of the pen 41, is displayed on the LCD 6. In this manner, line drawing information of desired letters and drawings, for example, can be input to the touch tablet 6A, and in turn displayed on the LCD 6.

Further, the line drawing information may be input by the pen 41 when the image obtained from shooting is already displayed on the LCD 6. In such a case, the line drawing information is synthesized (combined) with the shooting image information by the frame memory 35 and are displayed on the LCD 6 together.

Also, by using a predetermined pallet, the user is able to choose the color of the line drawing to be displayed on the LCD 6. Color choices may be black, white, red, blue and others. The execution key 7B, of the control keys 7, may be pressed after line drawing information is input to the touch tablet 6A by the pen 41. As a result, the line drawing information accumulated in the buffer memory 36 is supplied along with the header information regarding input date to the memo information recording area of the memory card 24. This information is recorded in the memory card 24. In this situation, the line drawing information recorded in the memo information recording area of the memory card 24 includes compressed information.

The line drawing information input using the touch tablet 6A may include information with a high spatial frequency content. As a result, if the aforementioned JPEG method is used to compress the line drawing image, the compression efficiency is poor. Since the amount of information does not decrease, the required time for compression and decompression becomes longer. In addition, compression using the JPEG method is lossey compression. As a result, such method is not suitable for compression of line drawing information containing small amounts of information. This is due to gathering and smearing resulting from missing information and becomes noticeable when information is decompressed and displayed on the LCD 6.

Therefore, in the arrangement of the present embodiment, line drawing information is compressed using the run-length method. Such method is used in facsimile machines, for example. The run-length method scans the line drawing screen in the horizontal direction. The line drawing information is compressed by encoding each continuous length of information for each color, such as black, white, red and blue. Each continuous length of non-information, i.e. where there is no pen input is also encoded. By using the run-length method, line drawing information is compressed to a minimum amount of information. Also, control of missing information becomes possible, even when compressed line drawing information is decompressed. Also, if the amount of information is relatively small, it is possible to set the arrangement to prevent the line drawing information from being compressed.

As described above, if the line drawing information is input using the pen when a photographed image is already displayed on the LCD 6, the pen input is synthesized with the photographed image information in the frame memory 35. The synthesized image of the photographed image and line drawing is displayed on the LCD 6. The shooting image data and the line drawing information may be respectively recorded in the shooting image recording area and the memo information recording area of the memory card 24. Specifically, the two types of information may be recorded separately. As a result, the user may delete one of the two images, e.g., the line drawing, from the synthesized photographed image and line drawing image. This also allows further compression of information of each image using separate compression methods.

Figure 9:
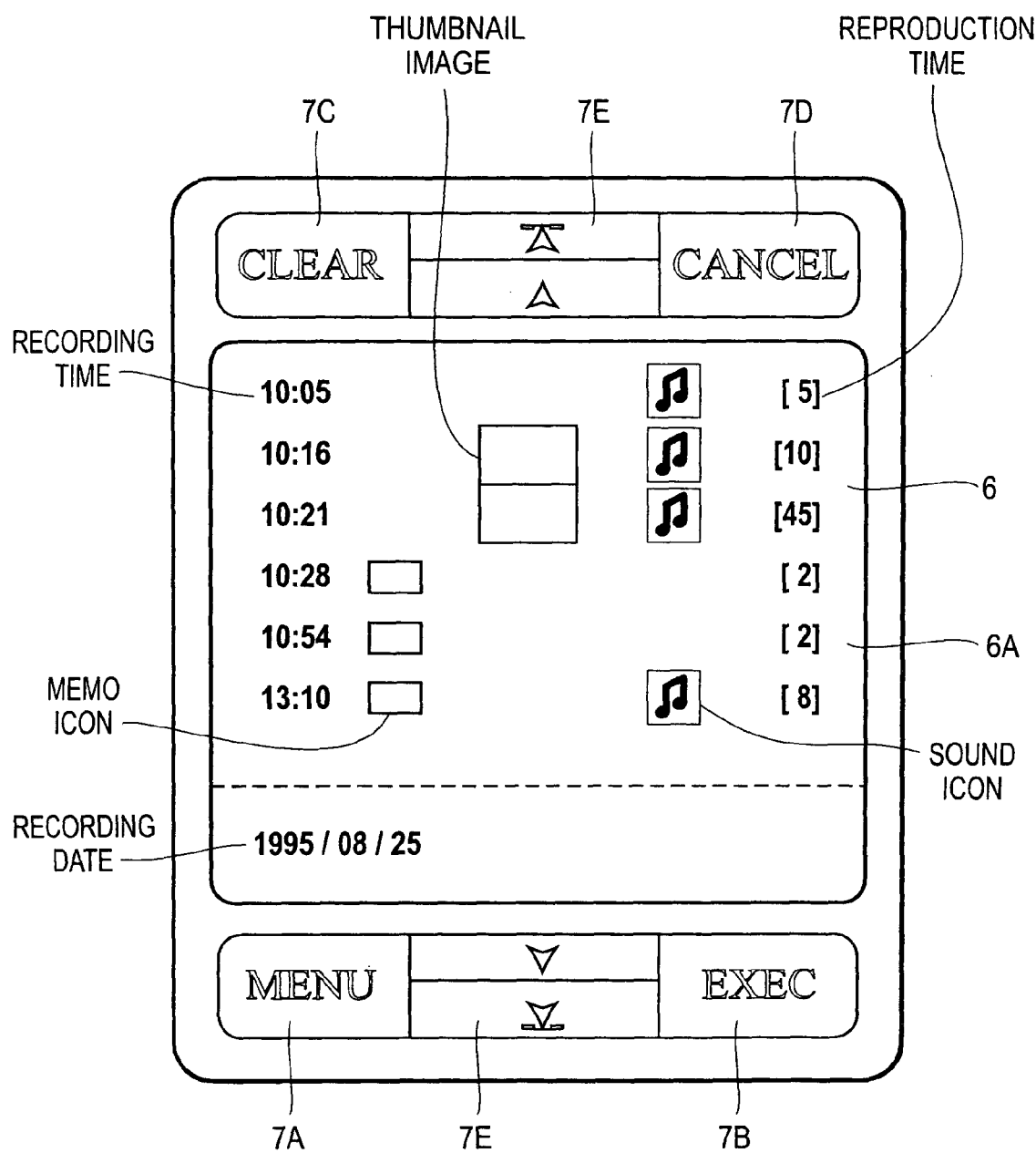
FIG. 9 shows an example of a display screen of the electronic camera shown in FIG. 1 and FIG. 2 in accordance with the invention.

When data is recorded in the sound recording area, the shooting image recording area, or the line-drawing information recording area, a predetermined display is displayed on the LCD 6 as shown in FIG. 9.

In the display screen of the LCD 6 shown in FIG. 9, the recording date of information, for example Aug. 25, 1995, is displayed in the bottom section of the screen. Also, the recording time of the information, recorded on that recording date, is displayed on the left-most side of the screen. A thumbnail image may be displayed to the right of the recording time. The thumbnail image is formed by ignoring or thinning out, i.e. reducing, bit map data corresponding to shooting image data recorded in the memory card 24. Thus, the entry (recording unit) for which a thumbnail image is displayed includes shooting image information. In other words, information recorded, i.e. input, at "10:16" and "10:21" includes shooting image information. However, information recorded at "10:05", "10:28", "10:54" and "13:10" does not include image information.

Also, a memo icon may be displayed on the right of the recording time and indicates that memo information is recorded as line drawing information. Also, a sound icon may be displayed on the right of the thumbnail image display area indicating that sound information is recorded.

In this situation, the information displayed on the same line in the same screen is recorded at the same time. Hereinafter, a unit of information composed of shooting images, memo and/or sounds that are recorded at the same time will be referred to as a "recording unit". Further, the number contained in brackets displayed on the right side of the sound icon indicates the reproduction time of each recording unit.

The user can select and designate information to be reproduced. Specifically, the user presses, with the tip of pen 41, any part of the thumbnail image or icon of the desired information in the LCD 6, as shown in FIG. 9. The selected information is then reproduced by pressing, with the tip of the pen 41, the execution key 7B as shown in FIG. 2 and FIG. 9.

For example, if the sound icon for the time "10:05", as shown FIG. 9, is pressed by the pen 41, the CPU 39 reads sound data corresponding to the selected recording date "10:05" from the memory card 24. The CPU 39 then decompresses the sound data and then supplies the sound data to the A/D and D/A conversion circuit 42. The A/D and D/A conversion circuit 42 converts the data to analog signals, and then reproduces the sound through the speaker 5.

When reproducing shooting image data, which is recorded in the memory card 24, the user selects the information by pressing the desired thumbnail image with the tip of the pen 41. The user then reproduces the selected information by pressing the execution key 7B. In other words, the CPU 39 instructs the DSP 33 to read the shooting image data corresponding to the selected image shooting date from the memory card 24. The DSP 33 decompresses the shooting image data, i.e. the compressed shooting data, which is read from the memory card 24. The CPU 39 then accumulates the shooting image data as bit map data in the frame memory 35 and displays the data on the LCD 6.

An image photographed in the S-mode is displayed as a still image on the LCD 6. The still image is reproduced from image signals of all of the pixels in the CCD 20. An image photographed in the L-mode is continuously displayed (as a moving picture) on the LCD 6 at a rate of 8 frames per second. In this case, the number of pixels actually displayed in each frame is one-fourth of all of the pixels in the CCD 20.

Human vision is sensitive to the deterioration of still image resolution. As a result, the user may easily detect thinning of pixels in a still image. However, in the L-mode, the shooting speed is increased and images are reproduced at a rate of 8 frames per second. Thus, the number of pixels in each frame is one-fourth of the number of pixels of the CCD 20. However, the amount of information per unit time doubles compared to the still image since the human eyes view images at a rate of 8 frames per second.

In other words, if the number of pixels for one frame of an image which is photographed in the S-mode were 1, then the number of pixels for one frame of an image photographed in the L-mode would become one-fourth. When the still image that is photographed in S-mode is displayed on the LCD 6, the amount of information entering the human eye per one second is 1=(number of pixels 1)×(number of frames 1). Alternatively, when an image photographed in the L-mode is displayed on the LCD 6, the amount of information viewed by the human eye per second is 2=(number of pixels ¼)×(number of frames 8). In other words, twice as much information is viewed by the human eye as compared to the still image. Thus, even if the number of pixels in one frame is reduced to one-fourth, the user is still able to view the reproduced images without much deterioration of the image quality during reproduction.

Additionally, in the arrangement of the present embodiment, a different sampling is executed for each frame. The sampled pixels are displayed on the LCD 6. As a result, an after-image effect of the human eye occurs. Thus, the user may be able to view the image photographed in the L-mode and displayed on the LCD 6 without noticing much deterioration of the image quality, even when three-fourths of the pixels are thinned out per one frame.

Also, an image photographed in the H-mode is displayed on the LCD 6 at a rate of 30 frames per second. Thus, the number of pixels displayed in each frame is one-ninth of the total number of the pixels of the CCD 20. However, for the same reasons as in the case of the L-mode, the user can view the image photographed in the H-mode and displayed on the LCD 6 without noticing much deterioration of image quality.

In the present embodiment, when an object is photographed in either the L-mode or the H-mode, the image processing unit 31 thins out or ignores the pixels in the CCD 20 in such a manner that the user does not notice much deterioration of the image quality during reproduction. Further, the load on DSP 33 and the CCD drive circuit 34 is reduced enabling low speed and low power operation of these units. Additionally, the apparatus provides operation at low cost and low energy consumption.

All the information in a recording unit may be reproduced. Specifically, all the information contained in a recording unit may be reproduced by selecting the recording time of the desired recording unit, and then operating the execution key 7B.

Also, in the present embodiment, the input date of each information is attached as header information to various information, i.e. data, which is recorded in the memory card 24. The user may select and reproduce the desired information from the date data displayed on LCD 6, as shown in FIG. 9.

In the arrangement of the present embodiment, the order of reproduction of recorded information may be pre-set. Specifically, a mode is provided in which information is reproduced according to the input order, i.e. a slide show mode. The slide show mode is described hereinafter.

Figure 10:
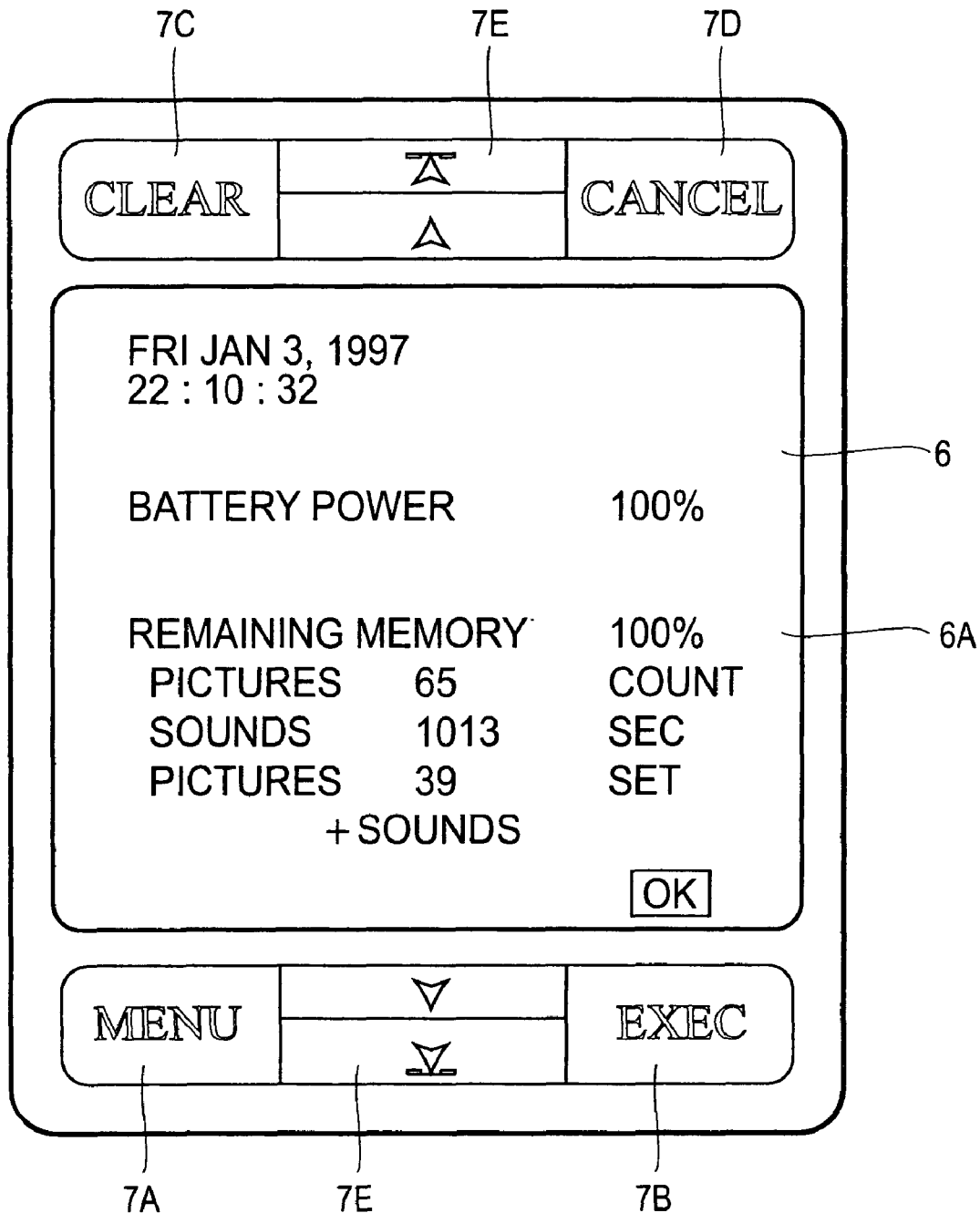
FIG. 10 shows an example of a display screen initially displayed after turning on the electric power source in the electronic camera shown in FIG. 1 in accordance with the invention.

When the LCD cover 14 of the electronic camera 1 is opened, the power source switch 11 is turned on. As a result, the display shown in FIG. 10 may appear on the LCD 6. In this display example, the current time and date, "FRI Jan. 3, 1997 22:10:32", appears at the very top of the screen. Below this, the current remaining battery charge (100%) is displayed. Further down, the current remaining memory capacity is displayed (100%). Even further down, the number of shootable images, i.e. pictures, (65), the amount of audio recordable time (1013 seconds), and the number of recordable sets (39 sets) of simultaneous image and sound recording are displayed.

Figure 11:
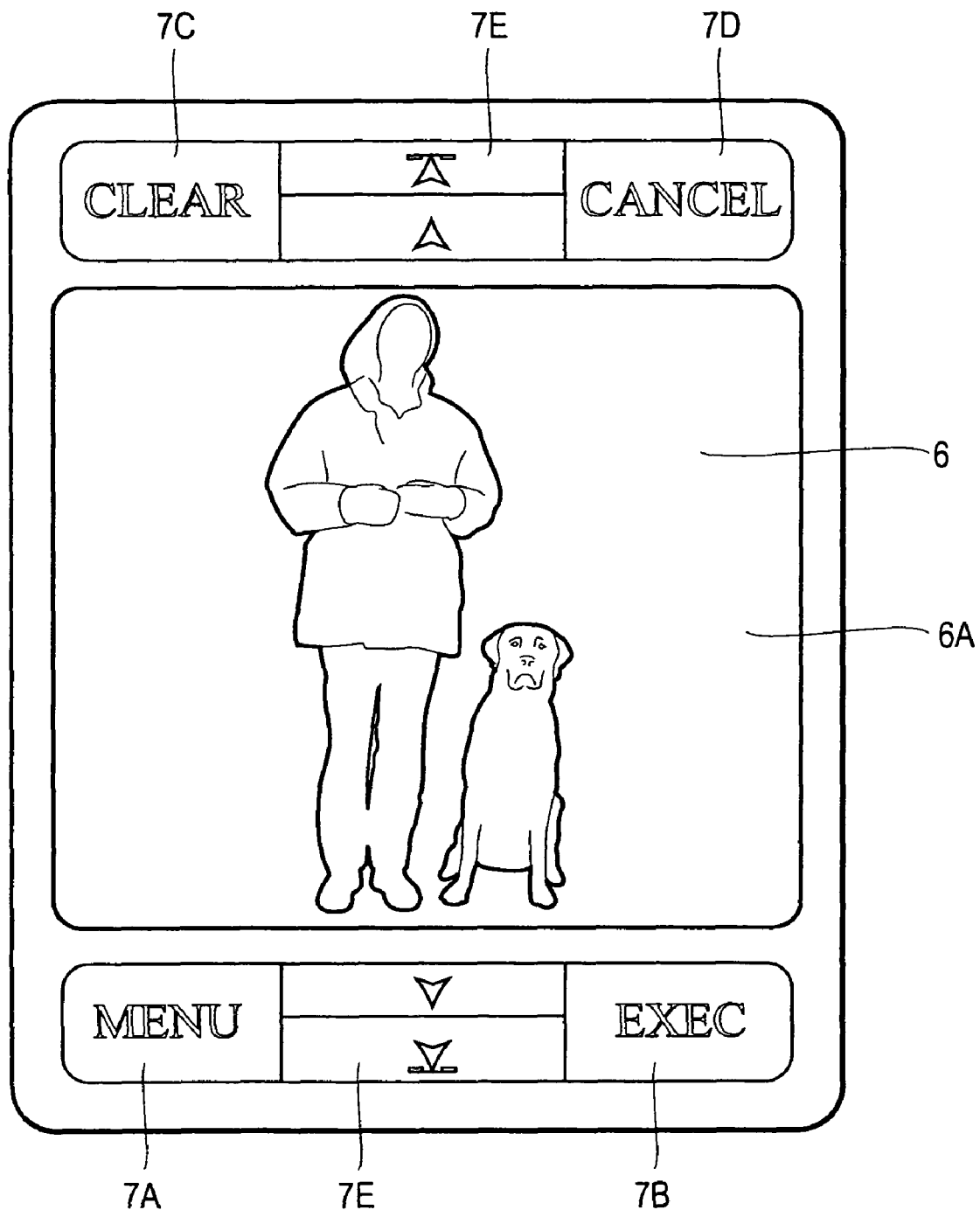
FIG. 11 shows an example of a display screen displaying an image in accordance with the invention.
Figure 12:
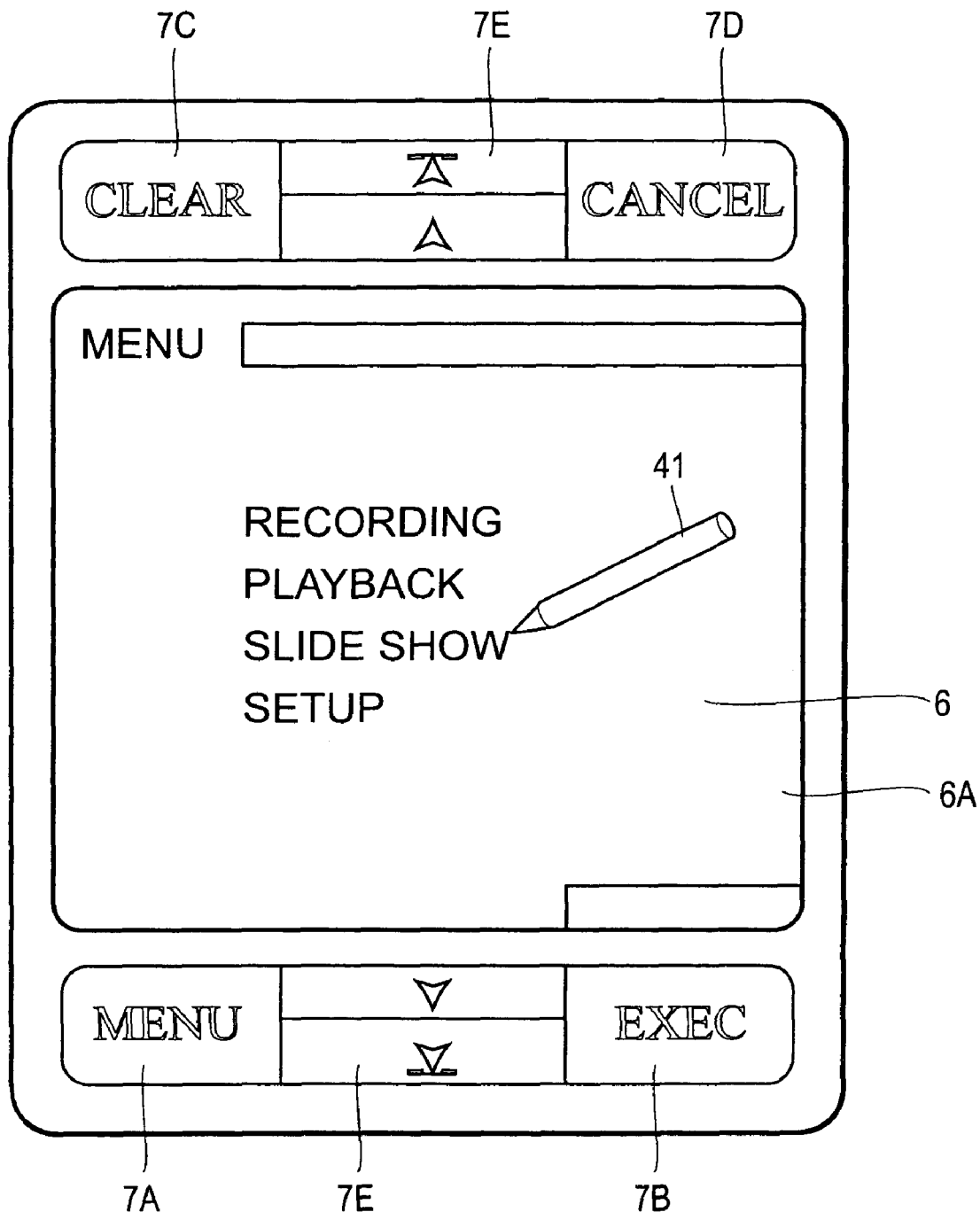
FIG. 12 shows an example of a menu screen displayed when the menu key is pressed in the example shown in FIG. 11 in accordance with the invention.

Additionally, when the "OK" key displayed on the right bottom corner of the screen is pressed with the pen 41, the image that is currently being input is displayed on the LCD 6, as shown in FIG. 11. With this display screen, if the menu key 7A, located at the left lower corner of the figure is pressed by the pen 41, the menu screen shown in FIG. 12 is displayed. In the display example of FIG. 12, the menu includes a "recording" mode, a "playback" mode, a "slide show" mode, and a "setup" (a configuration setting) mode, in order from the top of the display. The desired mode is attained by selecting a desired item on the menu using the pen 41.

Figure 13:
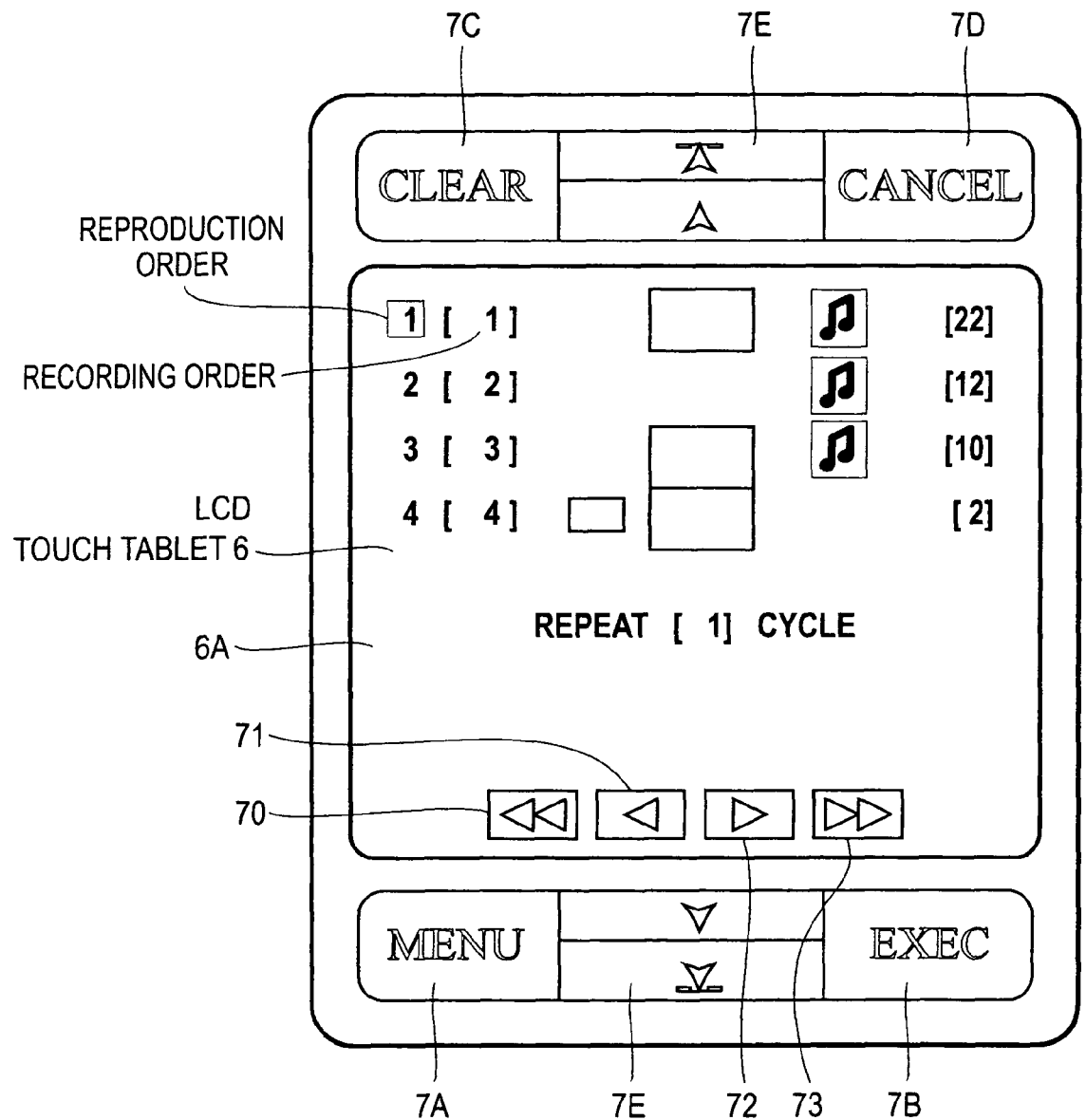
FIG. 13 shows an example of a display screen displayed when the "slide show" is selected in the menu screen of FIG. 12 in accordance with the invention.

Now, suppose the slide show mode, the third item, is selected using the pen 41. As a result, the setting screen of the slide show mode shown in FIG. 13 is displayed. With this display screen, the numbers displayed at the left edge of the screen indicate the reproduction order when the slide show is executed. The numbers on the right of the reproduction order numbers designate the order in which the information was recorded. Proceeding further to the right are a memo icon, thumbnail images, sound icons, and the reproduction times. These features are the same as explained with reference to FIG. 9.

Additionally, the "REPEAT [1] CYCLE" is displayed at the lower part of the screen and indicates the number of repeats, i.e. the reproduction frequency, of the slide show. In this example, all the information is reproduced only once. If "2" is set for the reproduction frequency, the same reproduction process is repeated after all the specified information is reproduced once, i.e. a first time.

The decrement keys (70, 71) and the increment keys (72, 73) displayed at the bottom of the screen are used when the reproduction order is changed. The keys decrement (decrease) or increment (increase) the value being displayed. In this case, the decrement key 71 and the increment key 72 respectively decrease and increase the value by 1. However, the decrement key 70 and the increment key 73 respectively decrease and increase the value by 5.

Figure 17:
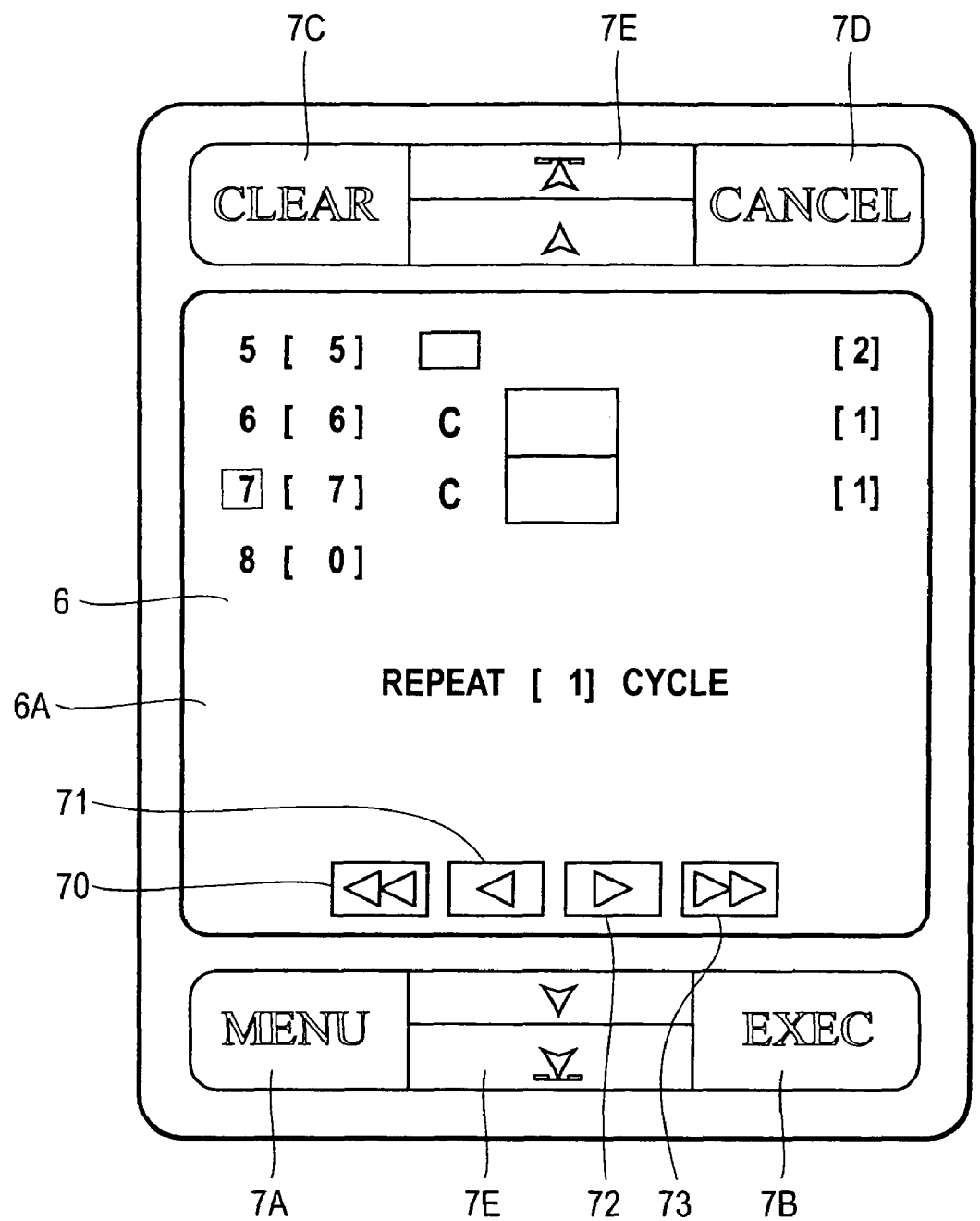
FIG. 17 shows an example of a display including reproduction information containing continuously photographed images in accordance with the invention.

The positive-negative reverse display, i.e., highlighting for example, of the first "reproduction order" in the first line indicates that reproduction begins with this reproduction information. Additionally, as shown in FIG. 17, the reproduction order of the reproduction information which is reproduced last may also be highlighted. In this manner, the starting and finishing position of reproduction may be set arbitrarily.

Figure 14:
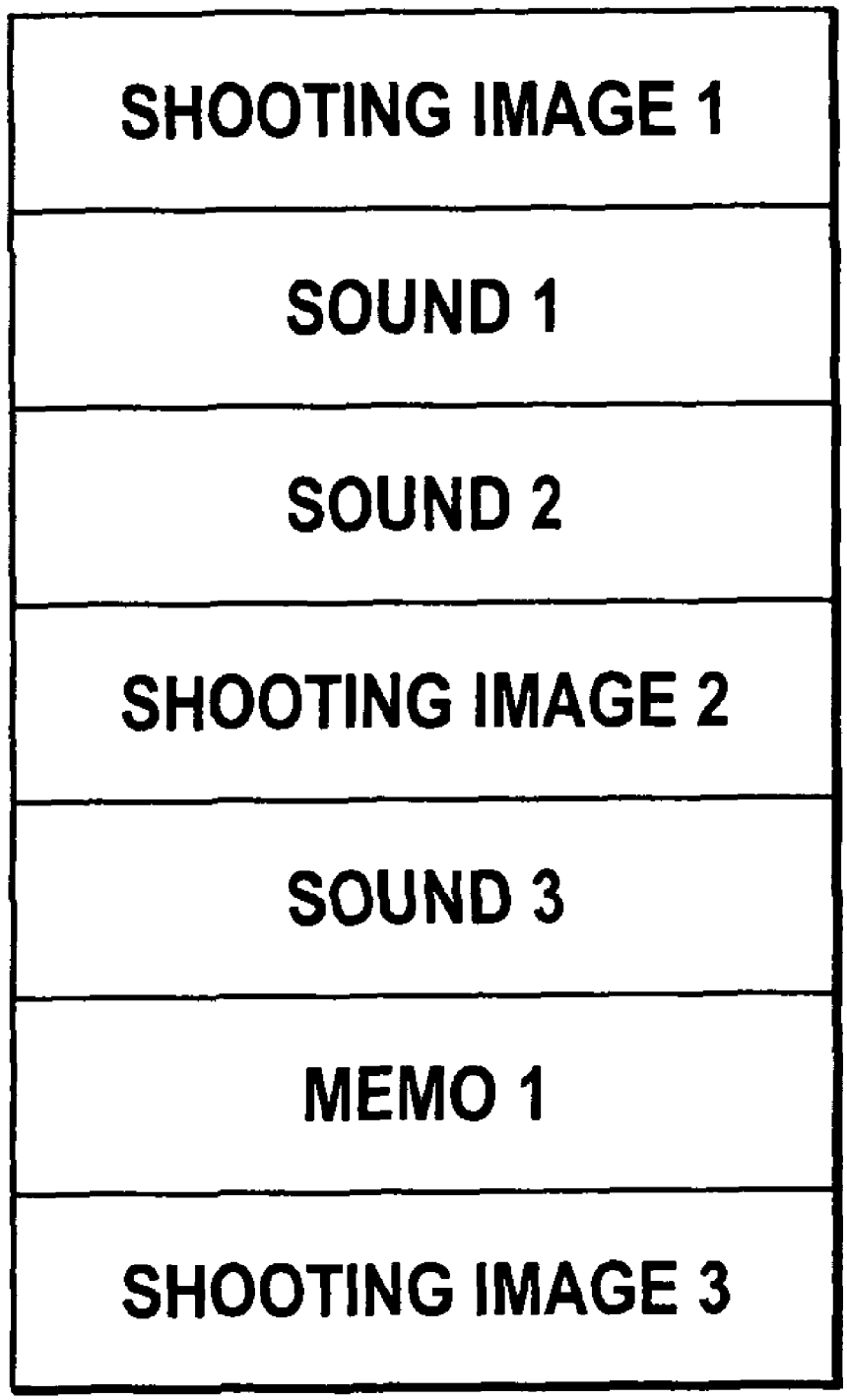
FIG. 14 shows an information storage configuration which corresponds to the example shown in FIG. 13 in a memory card in accordance with the invention.

FIG. 14 shows a configuration for storing information in the memory card 24 with respect to recording information described in conjunction with FIG. 13. In this example, the image (shooting image 1) displayed on the first line of FIG. 13 is stored first in the memory card 24. Then the sound (sound 1), which is also displayed in the first line of FIG. 13, is stored. Thereafter in order, the sound 2 (sound in the second line), the shooting image 2 (the shooting image in the third line), the sound 3 (sound in the third line), the memo 1 (the memo in the fourth line), and the shooting image 3 (image in the fourth line) are stored.

In this manner, the recorded information is sequentially recorded in the memory card 24. Note, the information is recorded in the memory card in the order of recording. However, in reality, information is recorded in a random order in an empty area of the memory card 24. FIG. 15(*a*) shows recording information for which information recorded is mutually associated with the date of recording. In other words, information items which are recorded simultaneously are treated as the same recording unit. Further, the information contained in each recording unit is designated by the recording information.

The recording order displayed in FIG. 15(*a*) corresponds to the recording order, which is displayed second from the left in FIG. 13, and indicates the order in which each recording unit was recorded. The "shooting image No." indicates the number of the shooting image contained in the recording unit, i.e. shooting image 1 shown in FIG. 14, for example. Similarly, the "memo No."indicates the memo number (memo 1 shown in FIG. 14, for example). Similarly, the "sound No." indicates the sound number (sound 1 shown in FIG. 14, for example). Further, the continuously photographed information indicates whether the image included in the recording unit includes a continuous image. If it does include a continuous image, the order in which the image is photographed is indicated. In this case, such recording information is recorded in a predetermined area of the memory card 24.

Further, FIG. 15(*b*) shows "reproduction information" which includes information necessary to reproduce each recording unit. Compared to the recording information, the "reproduction order" and "WAIT" are added to result in the reproduction information. Such reproduction order corresponds to the reproduction order that is displayed on the left side as shown in FIG. 13 and indicates the order in which the recording unit is to be reproduced. Further, WAIT indicates completion of reproduction of the recording unit and the waiting time required until the generation of the next information, i.e. the WAIT time. The reproduction information is also recorded in a predetermined area in the memory card 24.

Figure 16:
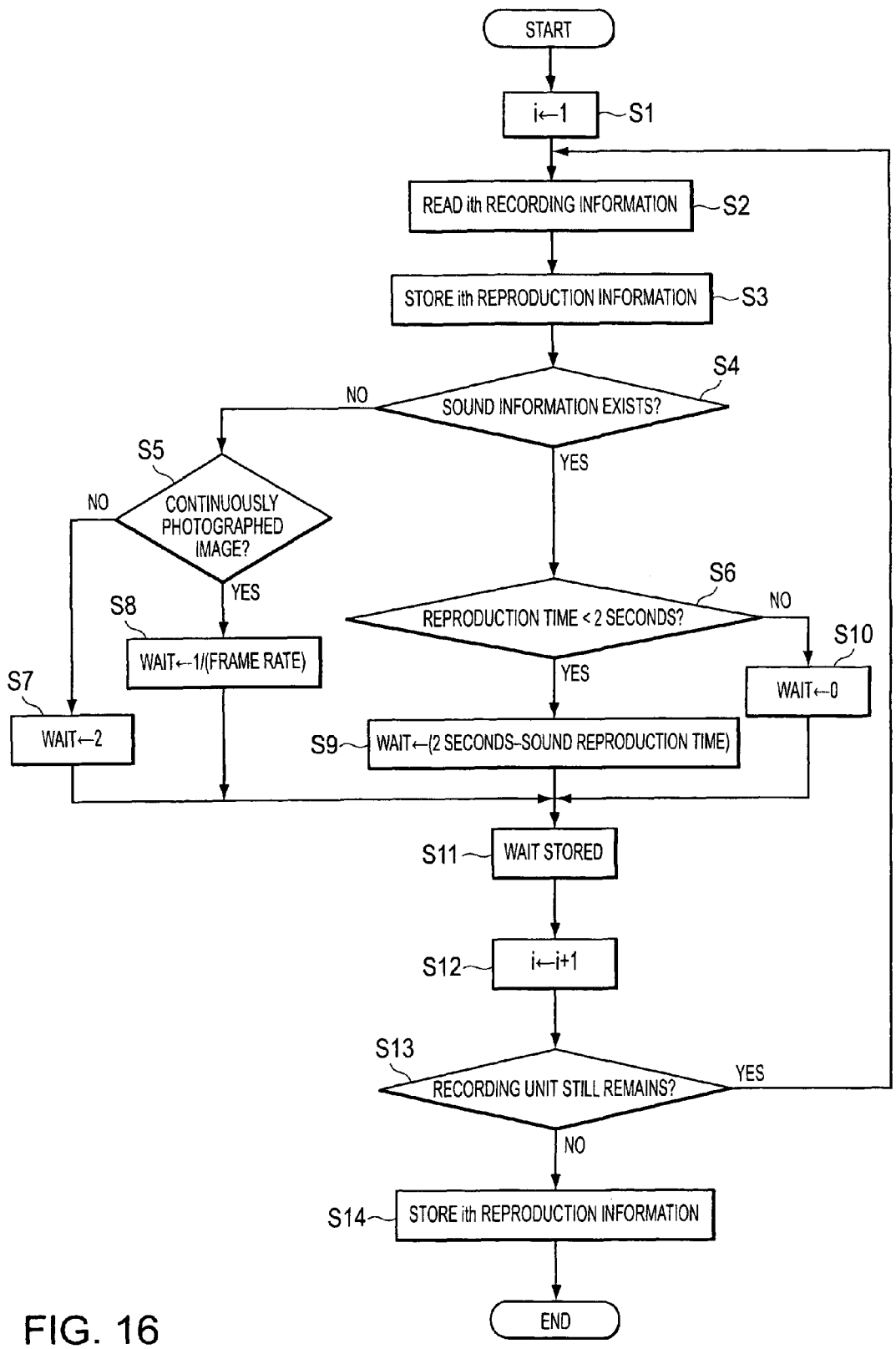
FIG. 16 is a flow chart showing an example of a process for generating reproduction information from recording information in accordance with the invention.

FIG. 16 shows an example of a process for creating the "reproduction information" shown in FIG. 15(*b*), based on the "recording information" shown in FIG. 15(a). This process is executed in the menu screen of FIG. 12 when the slide show mode is selected. When the process is executed, in step S1 the CPU 39 initializes the variable i, which counts the number of times the CPU 39 processes, to 1. Then, the CPU 39 moves to step S2 and reads the ith recording information from the memory card 24.

At the next step S3, the CPU 39 stores the ith reproduction information to the memory card 24. In other words, because part of the reproduction information is duplicated by the recording information, the duplicated part is copied to the predetermined area in the memory card 24. In this case, a default command dictates that the reproduction order is the same as the recording order. Thus, the recording order is copied, without any change, in the area where the reproduction order is stored.

In step S4, the CPU 39 determines whether sound information is contained in the ith recording unit. As a result, if the CPU 39 determines that the sound information is contained in the recording unit (Yes), the CPU 39 moves to step S6. Otherwise (No), the CPU 39 moves to step S5.

At step S5, the CPU 39 determines whether a continuously photographed image is contained in the recording unit. In other words, because sound information is determined not to be contained in the recording unit (No) at step S4, the recording unit contains either shooting image information, memo information or both. Thus, at step S5, the CPU 39 compares the image information with the "continuously photographed information" recording information, illustrated in FIG. 15, and determines whether the image information is continuously photographed. As a result, if the image information is determined to be continuously photographed (YES), the CPU 39 moves to step S8. In step S8, the CPU stores the reciprocal of the frame rate (the display time per one frame) in WAIT, and moves to step S11. However, if the image information is determined not to be continuously photographed (NO), the CPU 39 stores 2 (seconds), which is a default value, in WAIT and moves to step S11.

Alternatively, if sound information is determined to be contained (YES) at step S4, the CPU 39 moves to step S6. At step S6, the CPU 39 refers to the sound No. to read the header information of the sound information. The CPU then determines whether the reproduction time is less than 2 seconds. As a result, if the reproduction time of the sound information is determined to be less than 2 seconds (YES), the CPU 39 moves to step S9. In step S9, the CPU stores the value 2 (seconds) minus the sound reproduction time in WAIT, i.e. sets a value so the total sound reproduction time and WAIT is 2 seconds. The CPU then moves to step S11. Alternatively, if the sound reproduction time is determined to be 2 seconds or more (NO), the CPU 39 substitutes 0 into WAIT and moves to step S11.

At step S11, the value of WAIT is stored to the last digits of the reproduction information already stored in the memory card 24. Then, the CPU 39 increments the value of the variable i by 1 in step S12 and moves to step S13. In step S13, the CPU 39 determines whether a recording unit still remains. As a result, if a recording unit is determined to remain (YES), the CPU 39 returns to step S2 and repeats the same process as before. Alternatively, if a recording unit is determined not to remain (NO), the CPU 39 moves to step S14. In step S14, an extra empty reproduction information is stored in the memory card 24. Then the process is ended. The reason for recording empty reproduction information is explained hereinafter.

In the process described above, values are set as the reproduction order which are the same as the recording order. Also, the WAIT time is set according to the type of information contained in the recording unit. Further, if sound information is included in the recording information, and the reproduction time of the sound information is 2 seconds or more, the WAIT time is set as 0 seconds. If the reproduction time of the sound is less than 2 seconds, the difference from 2 seconds is set as the WAIT time. Thus, the total reproduction time becomes 2 seconds.

In this case, the display example shown in FIG. 13 is an example of reproduction information, created as described above, and displayed on the screen in ascending reproduction order. Further, the reproduction time displayed at the right side of the figure represents reproduction time including the WAIT time. Thus, for a recording unit which includes only images, for example recording units positioned along the bottom edge in FIG. 13, the reproduction time becomes 2 seconds, which is set as the WAIT time.

Further, if sound information is not included, for example the recording unit is composed of image information only, and if image information is not a continuously photographed image, 2 seconds is set as the WAIT time. However, if the image information is a continuously photographed image, the reproduction time of each frame is set as the WAIT time. For example, FIG. 17 shows a display of two continuously photographed images not containing sound. These images are photographed at a frame rate of 1 frame/second. In this case, 1 second=(1/1) is set as WAIT. Thus, "1" is displayed as the reproduction time as shown in FIG. 17. In this example, the "C" displayed on the left of the thumbnail images indicates that the image is a continuously photographed image.

In the process described above, if the reproduction time of the sound is less than 2 seconds, the difference is set for the WAIT. However, 0 seconds is set for the value of WAIT when the reproduction time is 2 seconds or more. Further, the WAIT time may always be set as 2 seconds in the case of sound information, similar to the case of image information.

Figure 18:
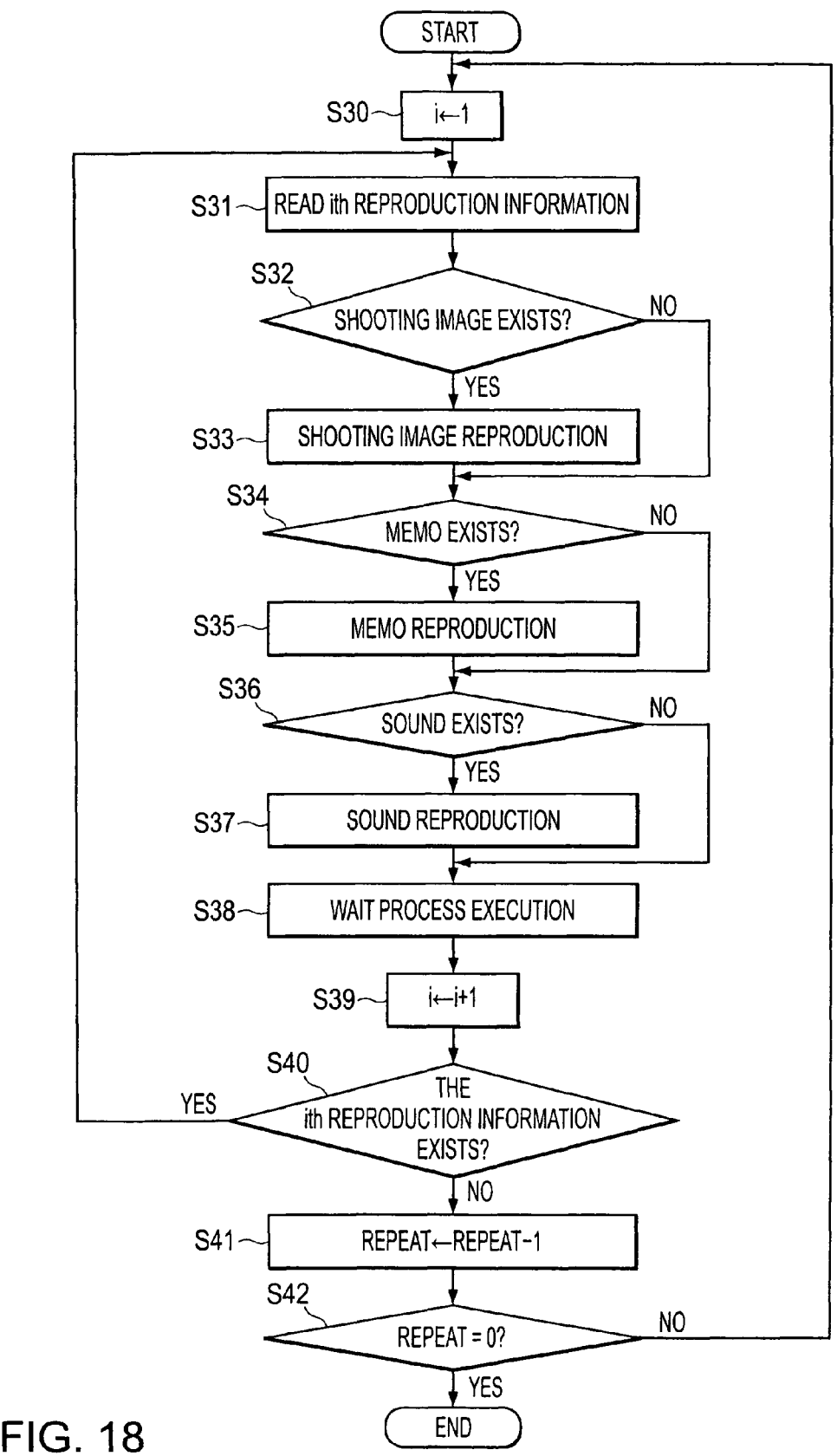
FIG. 18 is a flow chart showing an example of a process executed when the execution key is pressed in the display screen of FIG. 13 or FIG. 17 in accordance with the invention.

Next, a process of reproducing information using the slide show mode and based on the reproduction information created above will be described. FIG. 18 is a flow chart showing an example of such a process. The process is executed by pressing the execution key 7B at the lower right of the screen with the pen 41, as shown in the example of FIG. 13. When this process is executed, in step S30, the CPU 39 initializes the variable i, representing the number of times the process is repeated, to be 1. The CPU 39 then moves to step S31 and reads the reproduction information having i as the reproduction order from the memory card 24.

In step S32, the CPU 39 determines whether a shooting image is included, i.e. contained, in the reproduction information whose reproduction order is ith. As a result, if a shooting image is determined to be included (YES), the CPU 39 moves to step S33 and instructs the DSP 33 to read the appropriate image data from the memory card 24, and refers to the image No. of the reproduction information. The DSP 33 decompresses the shooting image data, i.e. the compressed shooting image data, read from the memory card 24. The data is accumulated in the frame memory 35 as bit map data, which is then displayed in the LCD 6.

Alternatively, if the CPU 39 determines, in step S32, that the shooting image is not contained in the reproduction information (NO), the CPU 39 skips the process of S33 and moves to step S34. In step S34, the CPU 39 determines whether memo information is contained in the reproduction information whose reproduction order is ith. As a result, if memo information is determined to be contained in the reproduction information (YES), the CPU 39 moves to step S35. Then, the CPU instructs the DSP 33 to read the appropriate image data from memory card 24, with reference to the memo No. of the reproduction information. Then, similar processes as those described with reference to the aforementioned image data are executed. As a result, the memo information is reproduced.

Alternatively, if memo information is determined not to have been contained in the reproduction information (NO) in step S34, the CPU 39 skips the process of step S35 and moves to step S36. In step S36, the CPU 39 determines whether sound information is contained in the reproduction unit whose reproduction order is ith. As a result, if sound information is contained in the reproduction unit (YES), the CPU 39 moves to step S37. In S37, the CPU compares the sound No., reads the appropriate sound data from the memory card 24, decompresses the sound data, and supplies the decompressed data to the A/D and D/A conversion circuit 42. The A/D and D/A conversion circuit 42 converts the supplied sound data into analog data and reproduces the data using the speaker 5.

Alternatively, if sound information is determined not to have been contained in the reproduction information, the CPU 39 skips the process in step S37 and moves to step S38. In step S38, the WAIT process is executed. In other words, the CPU 39 reads the WAIT value of the reproduction information and interrupts the process for a period of time which corresponds to the WAIT value. For example, if WAIT=2, a pause of 2 seconds is inserted after completion of information reproduction.

In the subsequent step S39, the variable i is incremented by 1 and the CPU 39 determines whether reproduction information, whose reproduction order is ith, exists. As a result, if the reproduction information whose reproduction order is ith is determined to exist (YES), the CPU 39 returns to step S31 and processes similar to those described above are repeated. If the reproduction information is determined not to exist (NO), the CPU 39 moves to step S41. In step S41, the variable "Repeat", i.e. the number of times reproduction is to be repeated, is input from "REPEAT [1] CYCLE", is displayed in the lower section of FIG. 13, and is decremented by 1. The CPU 39 then moves to step S42.

In step S42, the CPU 39 determines whether the value of the variable "Repeat" is 0. As a result, if the value of the variable Repeat is determined not to be 0 (NO), the CPU 39 returns to step S30 and processes similar to those described above are repeated. If the value of Repeat is determined to be 0 (YES), the CPU 39 ends the process.

In the process described above, the recording unit is reproduced one by one in an order set in the slide show mode. Further, after each recording unit is reproduced, a pause for a period of time equivalent to the value in WAIT is inserted. Thus, the distinction between each recording unit is clear. This provides time for viewing images in a situation in which the information includes only images.

In the arrangement of the embodiment above, images reproduced in the LCD 6 are displayed and sound is reproduced by the speaker 5. However, images and the sound may be reproduced by an external monitor connected through a video jack and an audio jack (not shown). Thus, if a cable is connected to a video jack, the LCD display may be stopped to prevent wasting of the battery.

Additionally, if the increment key 72 is pressed when the number of repetitions of reproduction, displayed in the lower section of FIG. 13, is changed to 999, "E" is displayed. This designates that reproduction will be continuously repeated. Further, if the cancel key 7D is pressed during execution of reproduction in the slide show mode, the CPU 39 interrupts the reproduction process and the screen shown in FIG. 13 returns.

Furthermore, if the LCD cover 14 is closed during execution of reproduction in the slide show mode, the apparatus may be made to record images and sounds by immediately shifting to the recording mode. With such an arrangement, it is possible to record information immediately, even during reproduction. Thus, unexpected situations may be effectively dealt with. Additionally, in the arrangement of the embodiment described above, information recorded is reproduced based on the order of recording. However, the reproduction order may be changed. Such a process is described hereinafter, with reference to FIG. 19.

Figure 19:
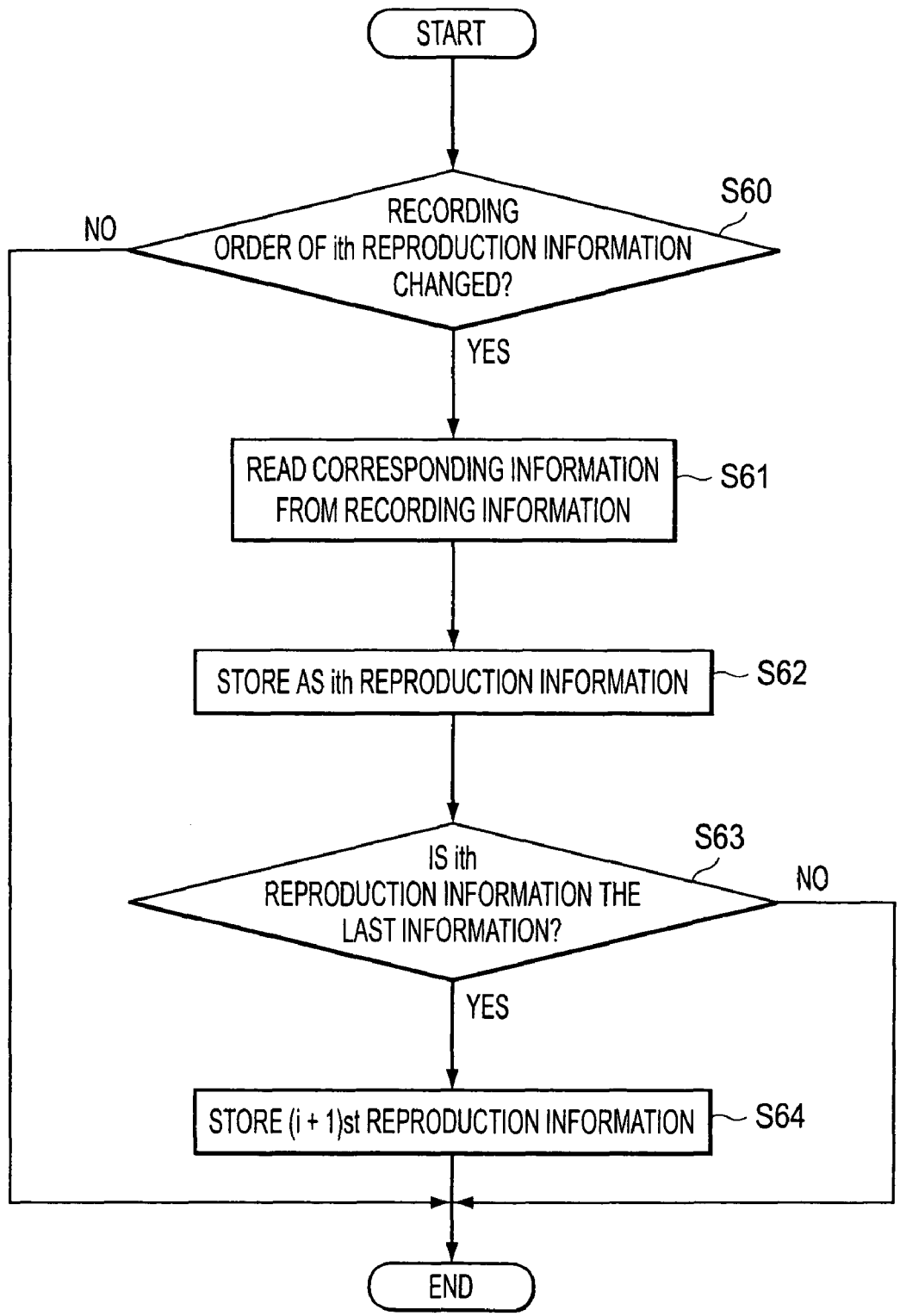
FIG. 19 is a flow chart showing an example of a process for setting the order in which information is reproduced using the process of FIG. 18 in accordance with the invention.

The process of FIG. 19 is executed when the slide show mode is selected. Upon execution of this process, in step S60, the CPU 39 determines whether the recording order of the recording unit whose reproduction order is ith, i.e. the value displayed in the second row from the left in FIG. 13, has changed. As a result, if the recording order of the ith recording unit is determined to have been changed (YES), the CPU 39 moves to step S61. The process is terminated if the recording order is determined not to have been changed (END).

Figure 20:
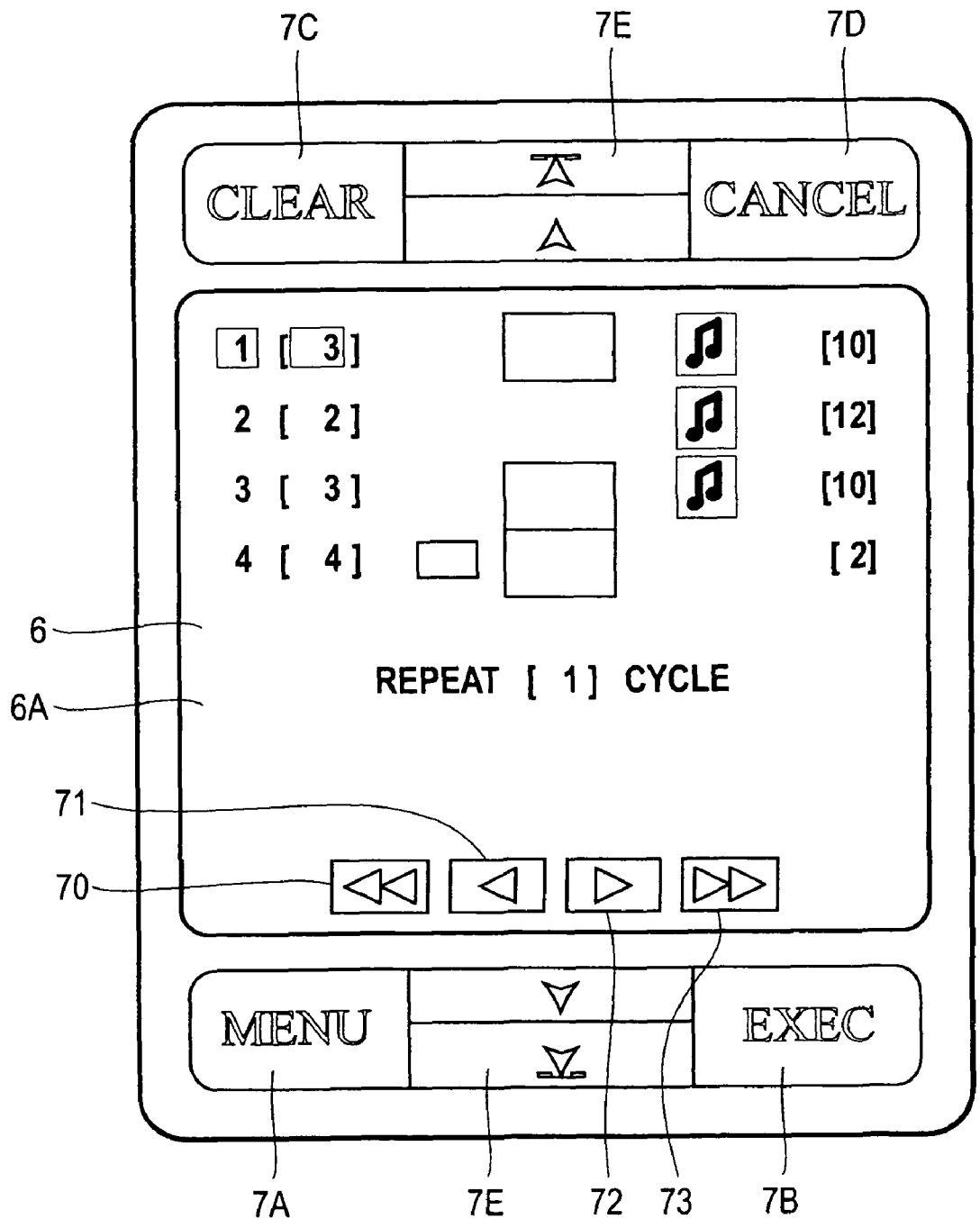
FIG. 20 shows an example of a display when changing the reproduction order in accordance with the invention.

For example, in FIG. 20, when the "recording order" of the first recording unit is pressed by the pen 41, the display color of that section is highlighted, or otherwise marked, to indicate that that particular "recording order" has been designated. Also, if the increment key 72, which is displayed at the bottom of the screen, is pressed only twice the recording order changes from 1 to 3 as shown in the figure. When the recording order is changed in this manner, the recording unit to be reproduced first (the recording unit whose reproduction order is first) is changed with information whose recording order is 3rd. Upon execution of such input, the CPU determines that the decision is (YES) in step S60 and moves to step S61.

In step S61, the CPU 39 reads the recording information, whose recording order is the changed value, from the memory card 24. Further, the CPU 39 produces WAIT information by executing a process similar to that explained with reference to FIG. 16. The CPU also attaches the WAIT information to the recording information read in step S61, and writes the resulting information on the memory card 24 as ith reproduction information, i.e. renews the ith reproduction information with this information.

Next, the CPU 39 moves to step S63 and determines whether the ith reproduction information is the last information to be reproduced. As noted above, the reproduction information is displayed in reverse. As a result, if the ith reproduction information is determined to be the information to be reproduced last (YES), the CPU 39 moves to step S64. However, if the ith reproduction information is determined not to be the last information (NO), the CPU ends the process (END).

Figure 21:
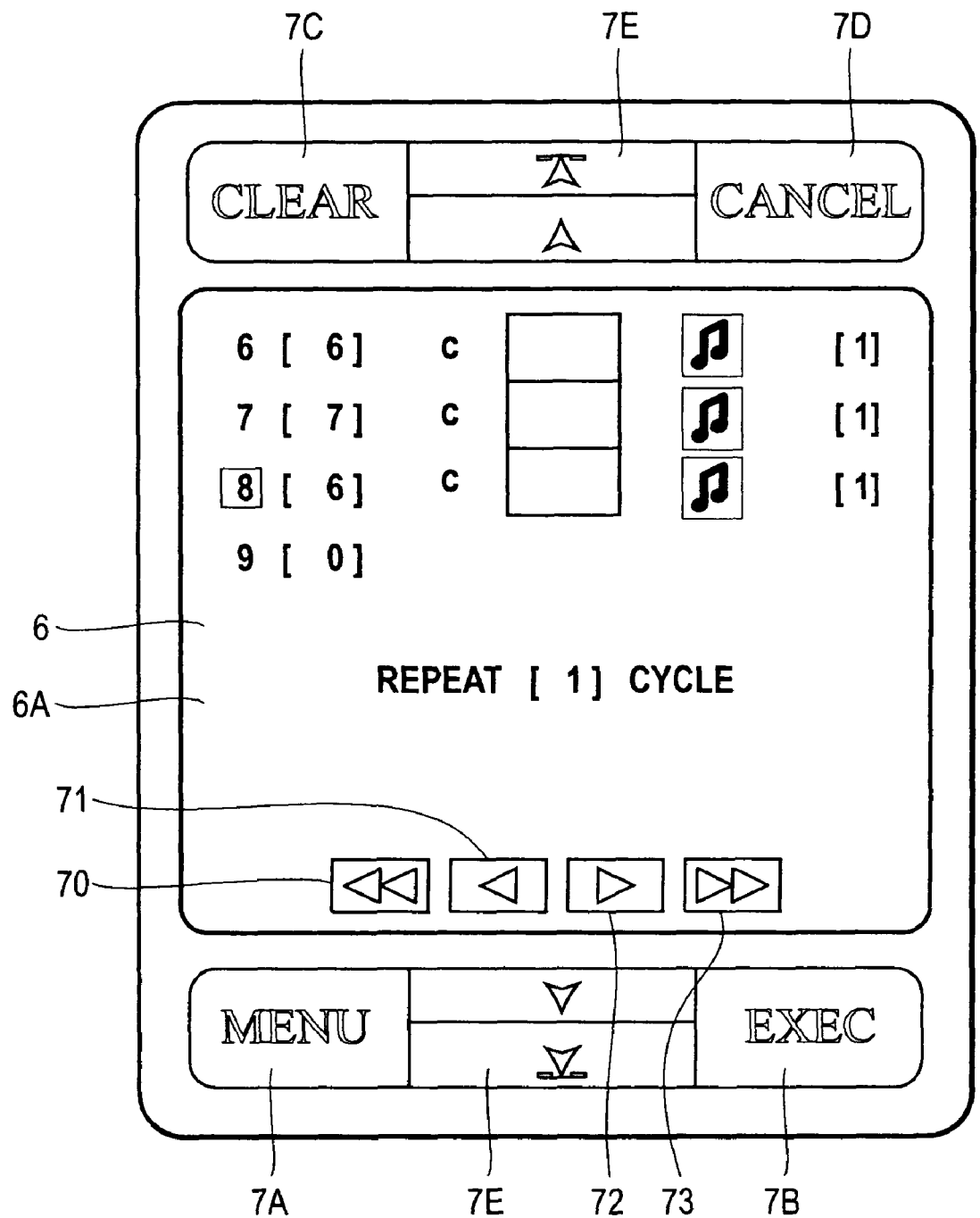
FIG. 21 shows an example of another display when changing the reproduction order in accordance with the invention.

In step S64, empty information is stored in the memory card 24 as (i+1)st reproduction information and the process is ended (END). In other words, as shown in FIG. 21, an empty reproduction information is displayed at the end of the setting screen of the slide show. This is in preparation for when a reproduction item is added. If a new item is added by changing the empty (ith) reproduction information, an (i+1)st empty reproduction information may be added to prepare for the situation in which another new information is added.

In the process described above, it is possible to freely set the order of information to be reproduced in the slide show mode. Further, if the reproduction information is a continuously photographed image, the order of reproduction may be reversed and the continuously photographed image may be played in reverse so as to execute reproduction. In this situation, the reproduction information which is set in the manner described above is recorded in the memory card 24. When the slide show mode is selected again, the information is reproduced in the order which was previously set. Further, the order set in this manner may be canceled by pressing the clear key 7D. For example, the clear key 7D may be pressed twice in a row so as to restore the default state.

Figure 22:
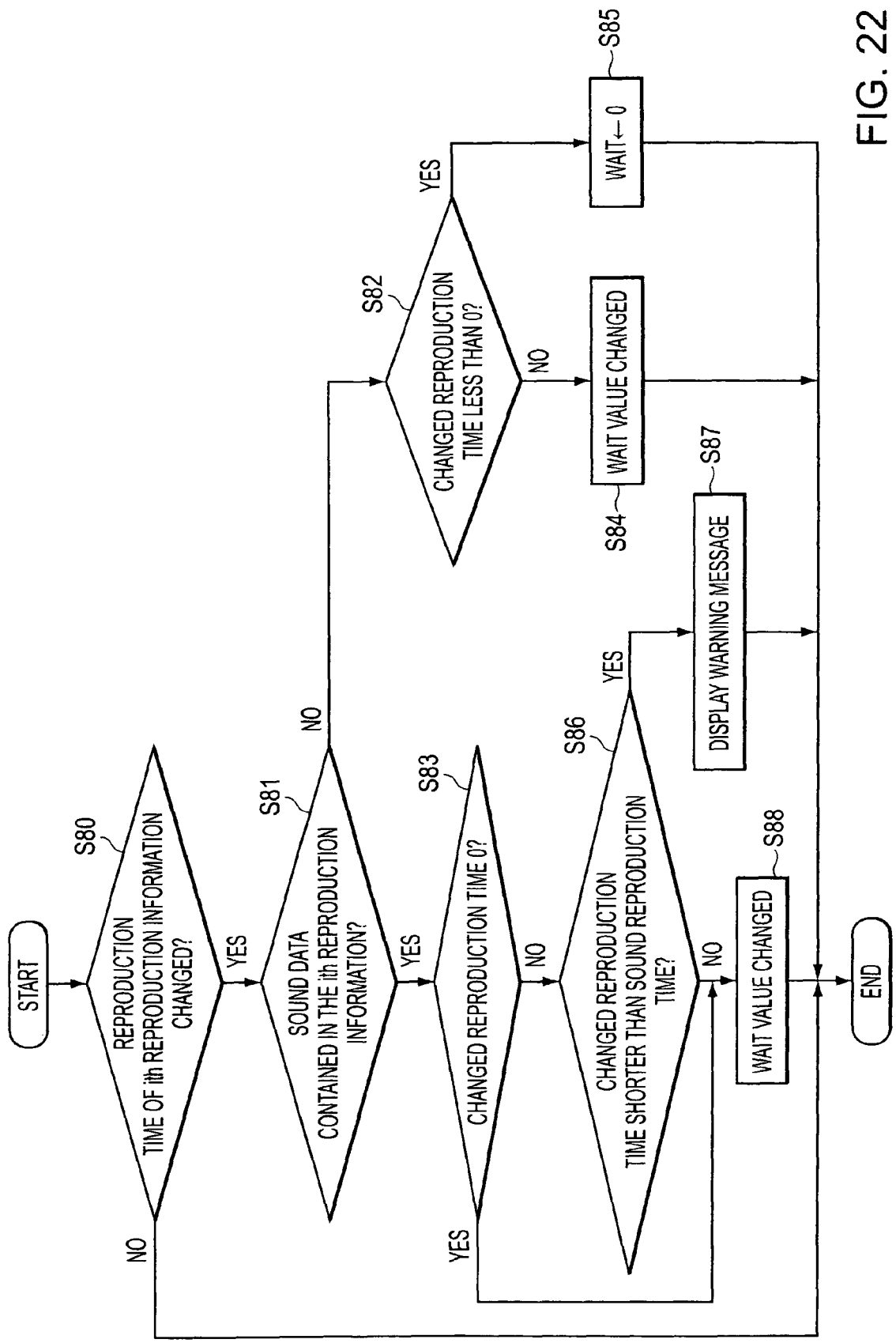
FIG. 22 is a flow chart showing an example of a process for setting reproduction time of information reproduced by the process of FIG. 18 in accordance with the invention.

The process of changing the reproduction time of the "reproduction information" is described next. FIG. 22 describes an example of the process in which the reproduction time is changed. This process is executed when the slide show mode is selected. Upon execution of this process, the CPU 39 determines, in step S80, whether the reproduction time of the ith reproduction information is changed. As a result, if the reproduction time of the ith reproduction information is determined to have been changed (YES), the CPU 39 moves to step S81. However, if the reproduction time is determined not to have been changed (NO), the process is ended (END).

Assume, for example, that with the display screen shown in FIG. 20, "10 seconds" (the reproduction time of the reproduction information in the first row) is designated by pressing thereupon using the pen 41. Further, assume that the 10 seconds is changed to 12 seconds by double clicking the increment key 72. Then, the CPU 39 determines that the decision in step S80 is affirmative (YES), and moves to step S81. In step S81, the CPU 39 determines whether the ith reproduction information contains sound information. As a result, if the ith reproduction information is determined to contain sound information (YES), the CPU 39 moves to step S83. If the reproduction information is determined not to contain sound information (NO), the CPU 39 moves to step S82.

In step S82, the CPU 39 determines whether the changed reproduction time is less than 0. As a result, if the reproduction time is determined to be less than 0 (YES), the CPU moves to step S85 and ends the process by substituting 0 for the variable WAIT (END). However, if the changed reproduction time is determined to be larger than 0 (NO), the CPU 39 moves to step S84, updates the WAIT value with the input reproduction time, and ends the process (END). In this case, if the reproduction time is set to be 0, the recording unit which is designated by this reproduction information is not reproduced.

Further, in step S81, if the CPU 39 determines that the ith reproduction information contains sound information (YES), the CPU 39 moves to step S83 and determines whether the changed reproduction time is 0 seconds. As a result, if the reproduction time is determined to be set at 0 seconds (YES), the CPU 39 moves to step S88, sets the WAIT value at 0, and ends the process. However, if the reproduction time is determined to have not been set at 0 seconds (NO), the CPU 39 moves to step S86.

In step S86, the CPU 39 determines whether the changed reproduction time is shorter than the sound reproduction time. As a result, if the changed reproduction time is shorter than the sound reproduction time (YES), the CPU 39 moves to step S87. In step S87, the CPU displays a warning message such as "unable to set!" on the LCD 6, and ends the process (END). Further, if the changed reproduction time is longer than the sound reproduction time (NO), the CPU 39 moves to step S88. In step S88, the CPU 39 updates the value of WAIT. In other words, the CPU 39 sets, as the new WAIT value, a value obtained by subtracting the sound reproduction time from the reproduction time being input. Then, the CPU 39 ends the process (END).

As described above, if the reproduction time of the first row is changed from 10 seconds to 12 seconds, the CPU determines that the decision in step S80 is YES and moves to step S81. Since the recording unit contains sound information, the CPU determines that the decision in step S81 is YES and moves to step S83. Since the changed reproduction time is not 0, the CPU 39 moves to step S86. In S86, the CPU 39 determines that the decision is NO since the changed reproduction time is longer than the sound reproduction time (12>10). The CPU then moves to step S88 and changes the WAIT value. In this case, the WAIT value is set at 0 seconds as a result of the process of step S10 in FIG. 16. Thus, the value is further updated from 0 second to 2 seconds.

In the process described above, it becomes possible to set the reproduction time for information which is reproduced during the slide show mode. As a result, it becomes possible to freely set reproduction time based on the type of information, for example. Further, as explained above, it becomes possible to cancel reproduction of information while keeping the reproduction information. This is accomplished by setting the reproduction time to be 0 seconds.

Figure 23:
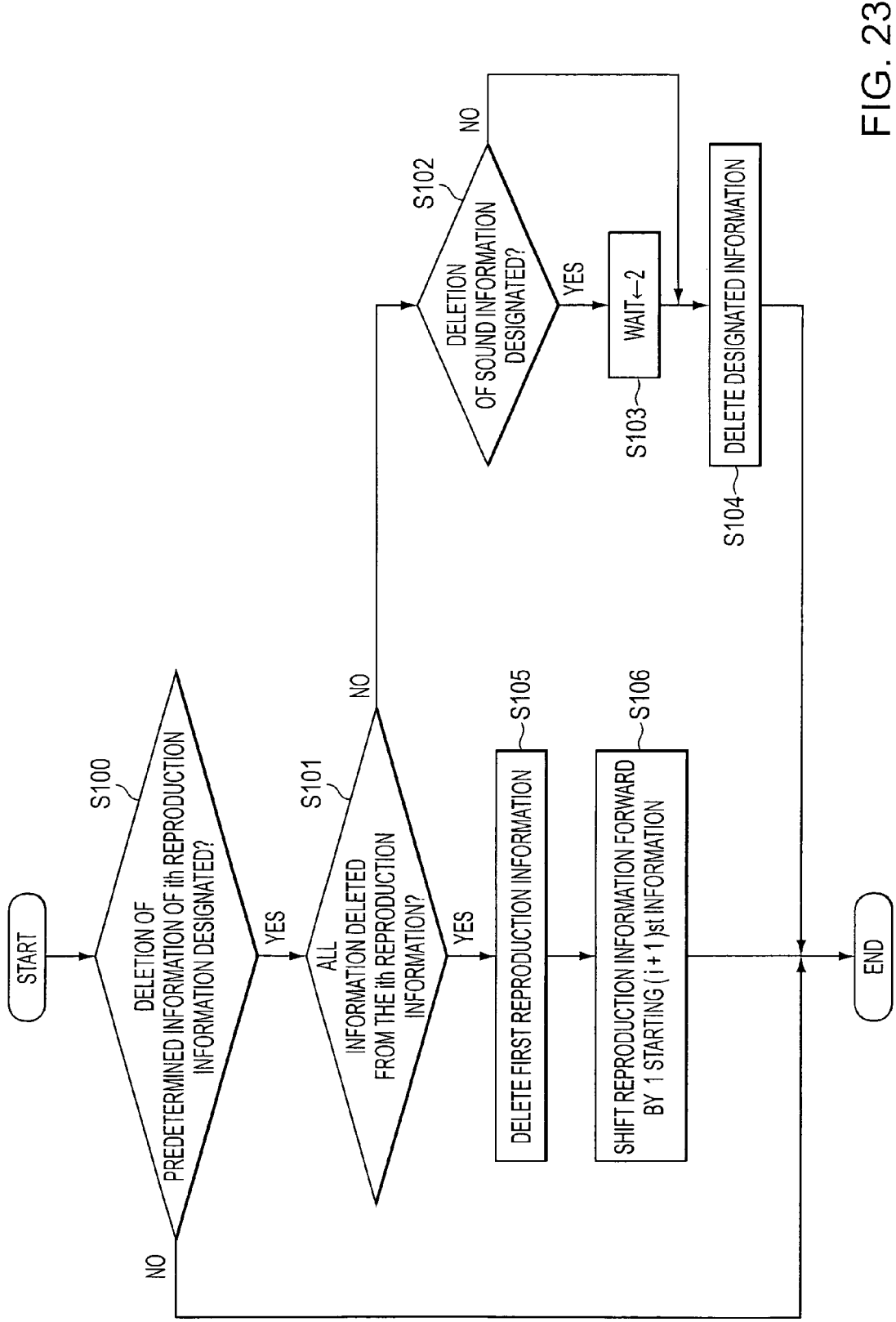
FIG. 23 is a flow chart showing an example of a process for setting types of information to be reproduced by the process of FIG. 18 in accordance with the invention.

The process of selecting information to be reproduced during the slide show mode is described next. FIG. 23 shows an example of a process to select the information to be reproduced during the slide show mode. In this case, the process is executed when the slide show mode is selected. Upon execution of the process, the CPU 39 determines in step S100 whether deletion of predetermined information in the ith reproduction information is designated. As a result, if deletion of the predetermined information in the ith reproduction information is determined to be designated as (YES), the CPU 39 moves to step S101. If deletion is determined to have not been designated (NO), the CPU 39 ends the process (END).

For example, if the sound icon (in the reproduction information in the first row in FIG. 20) is pressed by the pen 41, and the clear key 7C is subsequently pressed, the CPU 39 determines that the decision in step S100 is YES. The CPU then moves to step S101. In step S101, if designated information is deleted, the CPU 39 determines whether all the information of the ith reproduction information is deleted. As a result, if all the information is determined to have been deleted (YES), the CPU 39 moves to step S105. However, if only part of the information is determined to have been deleted (NO), the CPU 39 moves to step S102.

In step S102, the CPU determines whether deletion of sound information is designated. As a result, if deletion of sound information is determined to have been designated (YES), the CPU 39 moves to step S103. The CPU substitutes 2 in WAIT. Note that after deletion of the sound, only image remains. Further, note that "2" is the default value of WAIT for image. The CPU then moves to step S104. Also, if deletion of the sound information is determined not to have been designated, the CPU 39 skips the process of step S103 and moves to step S104.

In step S104, the CPU 39 deletes the designated information from the reproduction information. In other words, the CPU 39 deletes the information No. corresponding to the designated information from the reproduction information shown in FIG. 15(b). The CPU then ends the process (END). Further, in step S101, if all the information is determined to be deleted from the ith reproduction information (YES), the CPU 39 moves to step S105. In step S105, the CPU deletes all the ith reproduction information. The CPU 39 then moves to step S106, shifts the reproduction information starting (i+1)st information forwards by 1, and ends the process (END).

Assume a case in which deletion of the sound information of the first row in FIG. 20 is designated. Then, the CPU 39 determines that the decision in step S100 is YES and moves to step S101. In this case, even after the sound information is deleted, the image information remains. Thus, the CPU 39 determines that the decision in step S101 is NO and moves to step S102. In step S102, deletion of the sound information is designated. Thus, the CPU 39 determines that the decision is YES and sets 2 for WAIT in step S103. Further, in step S104, the sound No. of the reproduction information described in FIG. 15(*b*) is deleted. As a result, the sound information is deleted from the reproduction information in the first row and the reproduction time is set at 2 seconds.

Further, if the clear key 7C is pressed, for example, after designation by the pen 41 of all the information of the reproduction information of the first row, the CPU 39 determines that the decision in step S101 is YES. Then, all the information of the first reproduction information is deleted in step S105. In the following step S106, the reproduction order of the reproduction information starting with the second row is decremented by 1. The screen display is also scrolled upward by 1 row.

In the process described above, it is possible to properly select and reproduce information contained in the recording unit during the slide show mode. Further, if predetermined information is deleted, the predetermined information is only deleted from the reproduction information. Thus, the information itself is maintained and is not deleted from the memory card 24. As a result, information which has been deleted may be reproduced again during the slide show mode.

Figure 24:
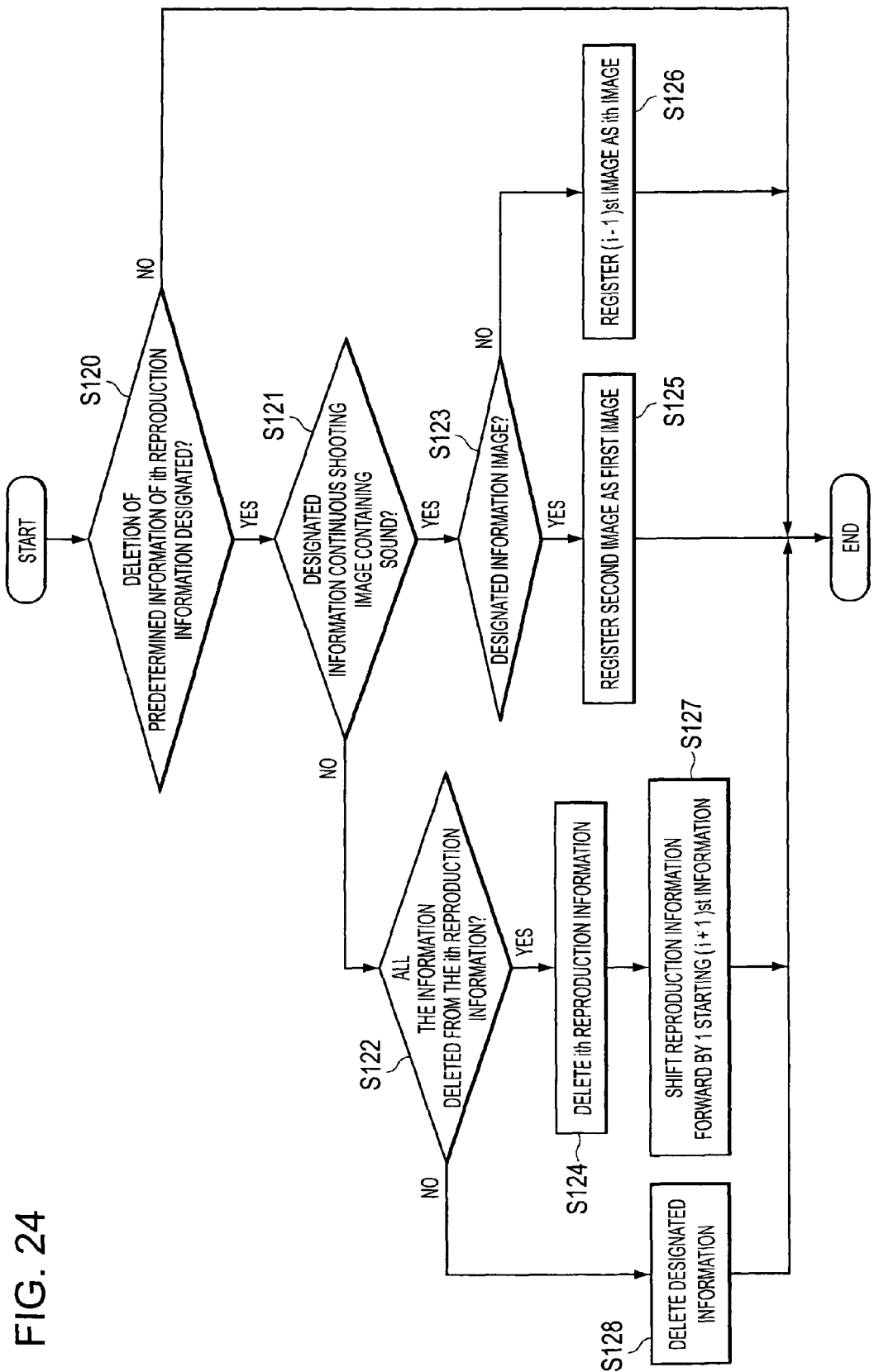
FIG. 24 is a flow chart showing an example of a process for changing the process shown in FIG. 23 to correspond to a continuous photographed image with sound in accordance with the invention.

Next, the process of deleting predetermined frames of a continuously photographed image, continuously photographed with sound, will be described. FIG. 24 is a flow chart showing an example of a process to delete a predetermined frame of a continuously photographed image, which is recorded with sound. If some of the information (sound and/or image) is deleted, gaps may appear in the reproduced continuously input information, causing intermittent reproduction. Hence, the following process is structured in such a manner that the problems described above are prevented.

The process described in FIG. 24 is executed when the slide show mode is selected. When the process is executed, the CPU 39 determines whether the deletion of predetermined information from the ith information is designated. As a result, if the deletion of the predetermined information from the ith information is determined to have been designated (YES), the CPU 39 moves to step S121. Alternatively, if the deletion is determined not to have been designated (NO), the process is ended (END).

In step S121, the CPU 39 determines whether the information designated for deletion is continuously photographed information containing sound information. In other words, the CPU 39 compares the continuously photographed information of the reproduction information described in FIG. 15(*b*) with the sound No. The CPU further determines whether the information designated is continuously photographed image and if it contains sound information. As a result, if the information designated is determined to be of a continuously photographed image and to contain sound information (YES), the CPU 39 moves to step S123. However, if the designated information is determined either not to be a continuously photographed image or not to contain sound (NO), the CPU 39 moves to S122.

In step S123, the CPU 39 determines whether the designated information is the first continuously photographed image. If the designated information is determined to be the first continuously photographed image, the CPU 39 moves to step S125 and registers the second image as the first image. In other words, the CPU 39 copies the image No. of the second reproduction information to the image No. of the first reproduction information. The CPU then ends the process (END).

Further, in step S123, if the CPU 39 determines that the designated information is not the first continuously photographed image (NO), the CPU 39 moves to step S126. In step S126 the CPU registers the (i−1)st image as the ith image. Thus, the CPU 39 updates the image No. of the ith reproduction information for which deletion is designated with the image No. of the (i−1)st reproduction information. The CPU 39 then ends the process (END). As a result, information may be arbitrarily obtained out of a data base of information recorded by an electronic camera, for example. Also, the information may be reproduced in a predetermined order and even in a predetermined reproduction time.

Alternatively, if the designated information is determined not to be a continuously photographed image containing sound in step S121, the CPU 39 moves to step S122. At S122, the CPU 39 determines whether all the information of the ith reproduction information are to be deleted with the deletion of the designated information. As a result, if only part of the information is determined to be deleted (NO), the CPU 39 moves to step S128. In step S128, the CPU deletes the designated information from the reproduction information and finishes the process (END). Additionally, if all the information is determined to be deleted (YES), the CPU 39 moves to step S124. In step S124, the CPU 39 deletes all the ith reproduction information. Then, the CPU 39 moves to step S127 and shifts the reproduction information from the (i+1)st information forward by 1. In this case, this process is same as the process of step S106 in FIG. 23.

In the process described above, the predetermined frame may be deleted from the continuously photographed image for which sound is simultaneously recorded. However, the image before and after the frame, i.e., the image immediately after the frame if the frame is the first image, or the image immediately before the frame if the frame is not the first image, will be reproduced in its place. Further, the sound will be reproduced in the normal manner.

In the process described above, if the predetermined frame is deleted in the continuously photographed image containing sound, the image of the frame either immediately before or immediately after the deleted frame is displayed. However, deletion of the image may be prohibited if the continuously photographed image contains sound, for example. Alternatively, if the predetermined frame is deleted, only the sound may be reproduced without reproducing the frame.

The invention is not limited to the electronic camera of the above embodiment but may be applied to other information processing apparatus, for example, an electronic notebook.

Hereinafter, a second embodiment of the invention will be described.

Figure 25:
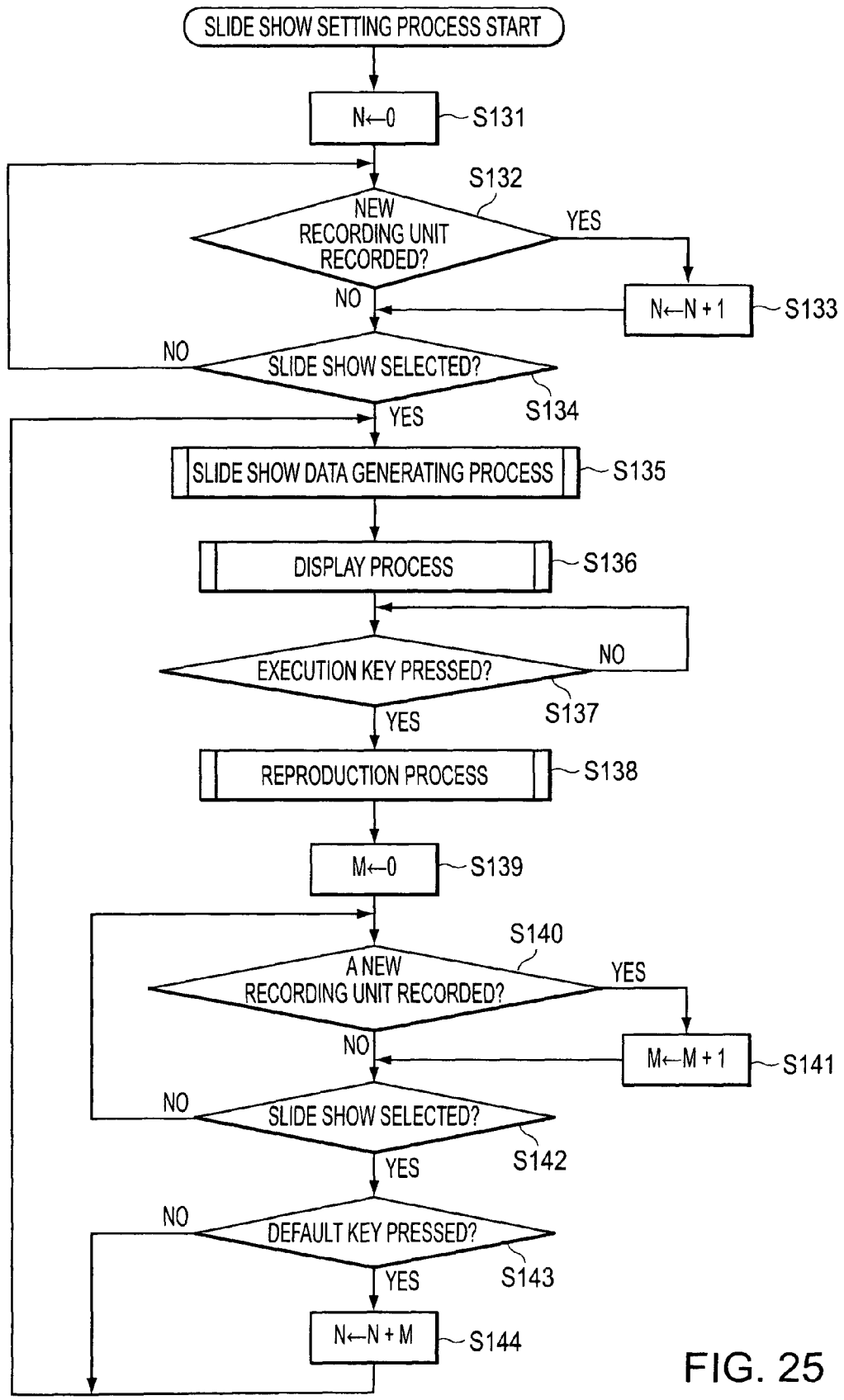
FIG. 25 is a flow chart showing an example of a process executed when the power source is turned on for the first time in an electronic camera in accordance with a second embodiment of the invention.

According to another aspect of the invention, with reference to FIG. 25, the power switch may be turned on for the first time in the electronic camera 1. Alternatively, a memory card 24 on which no shooting image is recorded may be mounted on the main body. In either of these situations, the process shown in FIG. 25 will be executed.

The process shown in FIG. 25 is for setting up a slide show. First, the CPU 39 initializes the value of the variable N. Specifically, at step S131 the CPU 39 assigns 0 to the recording unit number stored in the reproduction units, described below. The CPU then moves to step S132. At step S132, the CPU 39 determines whether a new recording unit has been recorded. In other words, the CPU 39 determines whether one of shooting image, memo or sound is recorded. As a result, if a new record unit is determined to have been recorded (YES), the CPU 39 moves to step S133. In step S133, the CPU increments the value of the variable N, which stores the recording unit number stored in the reproduction unit, by 1, and moves to step S134. Also, if the new recording unit is determined not to have been recorded at step S132 (NO), the CPU 39 moves to step S134.

At step S134, the CPU 39 determines whether the slide show mode is selected. The slide show is the third selection choice in the menu screen shown in FIG. 12 which is displayed by operation of the menu key 7A. As a result, if the slide show is determined not to have been selected (NO), the CPU 39 returns to step S132 and repeats the process similar to that described above. If the slide show is determined to have been selected, the CPU 39 moves to step S135. At step S135, a process to generate slide show data is executed. The details of this process are described hereinafter with reference to FIG. 26.

Figure 26:
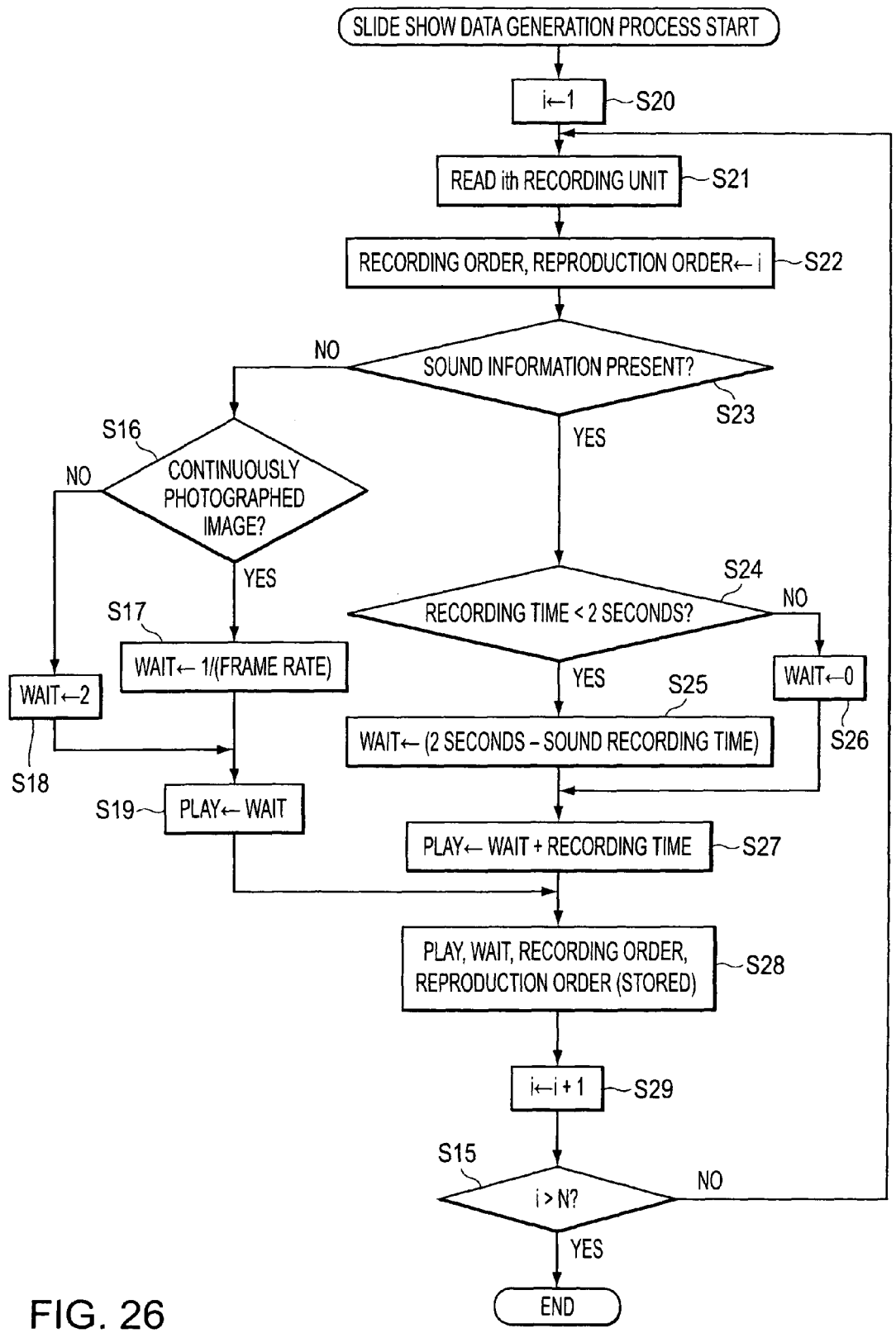
FIG. 26 is a flow chart showing the process in step S135 in FIG. 25 in accordance with the second embodiment of the invention.

When the process of step S135 in FIG. 25 is executed, this will cause the process of step S20 in FIG. 26 to be executed. In step S20, the CPU 39 initializes the value of variable i to be 1. This variable stores the number of times that the process is repeated. Then CPU 39 then moves to step S21 and reads the ith recording unit, i.e. the recording unit whose order of recording date is ith from the oldest, from the memory card 24. At the next step S22, the CPU 39 assigns both the recording order and the reproduction order of the recording unit, which is read from the memory card 24, a value ith. In other words, the recording unit whose recording date is ith from the oldest is naturally the recording unit which is recorded as ith. Thus, the recording order is set to be ith. Further, the reproduction order is also set to be ith because the reproduction order is set to be equal to the recording order (reproduction order=recording order) in the default state. The CPU then moves to step S23.

In step S23, the CPU 39 determines whether sound information is contained in the ith recording unit. As a result, if sound information is determined to be contained in the ith recording unit (YES), the CPU 39 moves to step S24. However, if sound information is determined not to be contained in the ith recording unit (NO), the CPU 39 moves to step S16. In step S16, the CPU 39 determines whether a continuously photographed image is contained in the recording unit. In other words, because sound information is determined not to have been contained in the ith recording unit (NO) in step S23, either the shooting image or memo information, or both, must be contained in the recording unit. Thus, the CPU 39 determines in step S16 whether this image information is continuously photographed. As a result, if the image information is determined to have been continuously photographed (YES), the CPU 39 moves to step S17. In step S17, the CPU stores the reciprocal of the frame rate (display time per frame) in the variable WAIT, which stores the wait time, described below. The CPU then moves to step S19. Also, if the image information is determined not to have been continuously photographed, in step S18 the CPU 39 stores the default value of 2 (seconds) in the variable WAIT, and moves to step S19.

Further, in step S19, the CPU 39 substitutes the value which is stored in the variable WAIT into the variable PLAY. The variable PLAY stores the reproduction time of each recording unit. The CPU then moves to step S28. In other words, in the case when sound is not contained in the recording unit and the shooting images are continuously photographed, the display time per one frame is made to be the reproduction time (=PLAY). However, in the case when the shooting image is a single image, the reproduction time is made to be the default value 2 (seconds).

Alternatively, in step S23, if it is determined that sound is contained in the recording unit (YES), the CPU 39 moves to step S24. In step S24, the CPU 39 refers to the sound header and determines whether the recording time of the sound, which is contained in the ith recording unit, is less than 2 seconds. As a result, if the sound recording time is determined to be less than 2 seconds (YES), the CPU 39 moves to step S25. In step S25, the CPU 39 stores 2 seconds (sound recording time) in the variable WAIT, i.e. the CPU sets the value so that the total of sound recording time and WAIT becomes 2 seconds. The CPU then moves to step S27. Alternatively, if the sound recording time is determined to have been more than 2 seconds (NO), in step S26 the CPU 39 substitutes 0 in the variable WAIT and moves to step S27. In this instance, the reason that the reproduction time of the recording unit is set to be at least 2 seconds is to allow the user enough time to observe the image that is contained in the recording unit.

At step S27, the sum of the value in WAIT and the sound recording time is stored in the variable PLAY, which stores the reproduction time. In other words, if the sound recording time is less than 2 seconds, the wait time and the sound recording time are set to add up to 2 seconds. If the sound recording time is more than 2 seconds, the wait time is set to be 0. Thus, the sum of the wait time and the sound recording time are always equal to the sound recording time.

Figures 29, 30:
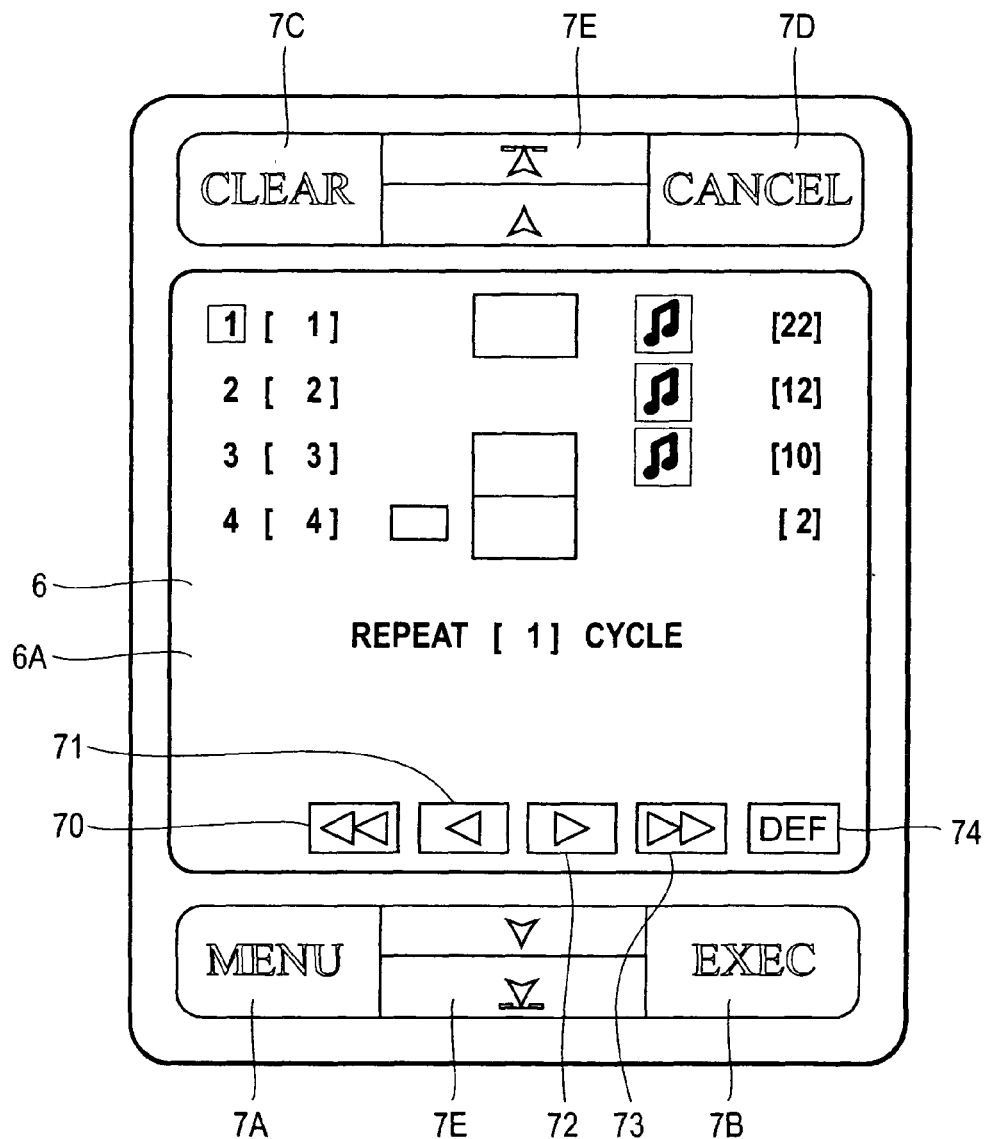
FIG. 29 shows an arrangement of a header generated through the process of FIG. 26 in accordance with the second embodiment of the invention.
FIG. 30 shows an example of a screen displayed on the LCD as a result of the process shown in FIG. 27 in accordance with the second embodiment of the invention.

In step S28, the CPU 39 reads the recording date of the ith recording unit from the memory card 24. Then, the CPU 39 adds the recording order 60B, the reproduction order 60C, PLAY (reproduction time) 60D, and the WAIT (wait time) 60E to the recording date 60A, which is input and stored as shown in FIG. 29. The recording date 60A will be stored in the predetermined area of the memory card 24 as a new header. Further, CPU 39 increments the value of the variable i by 1 at step S29 and moves to step S15.

At step S15, CPU 39 determines whether the value of the variable i is larger than the number N of the recording unit contained in the reproduction unit. As a result, if the value of the variable i is determined to be smaller than or equal to N (NO), the CPU 39 returns to step S21 and repeats the same process as described above. Further, if the value of the variable i is determined to be greater than N (YES), the CPU 39 returns to the process of step S136 in FIG. 25.

Through the process described above, the same value as the recording order is set as the reproduction order. Also, the wait time is set according the type of information contained in the recording unit. In other words, in the case when sound is contained in the recording unit and the sound recording time is 2 seconds or more, 0 is set as the wait time. However, in the case when the sound recording time is less than 2 seconds, the difference that the sound recording time is from 2 is set in the wait time. Thus, the reproduction time, which is the sum of the sound recording time and the wait time, equals 2 seconds. Further, in the case when the sound is not contained in the recording unit and the shooting images are continuously photographed images, the display time per one frame is set to be the wait time. However, in the case when the shooting image is a single image, the wait time is set to be the default value, specifically 2 seconds.

Hereafter, the totality of the slide show data generated by the process described above, i.e. all the recording units which compose the slide show data, will be referred to as a "reproduction unit". In the process described above, if the sound recording time is less than 2 seconds, the difference is set in WAIT. If the sound recording time is 2 seconds or more, the value of WAIT is set to be 0 in the case of sound information. However, the value of WAIT time may be set constantly to be 2 seconds, as in the case of images.

Figure 27:
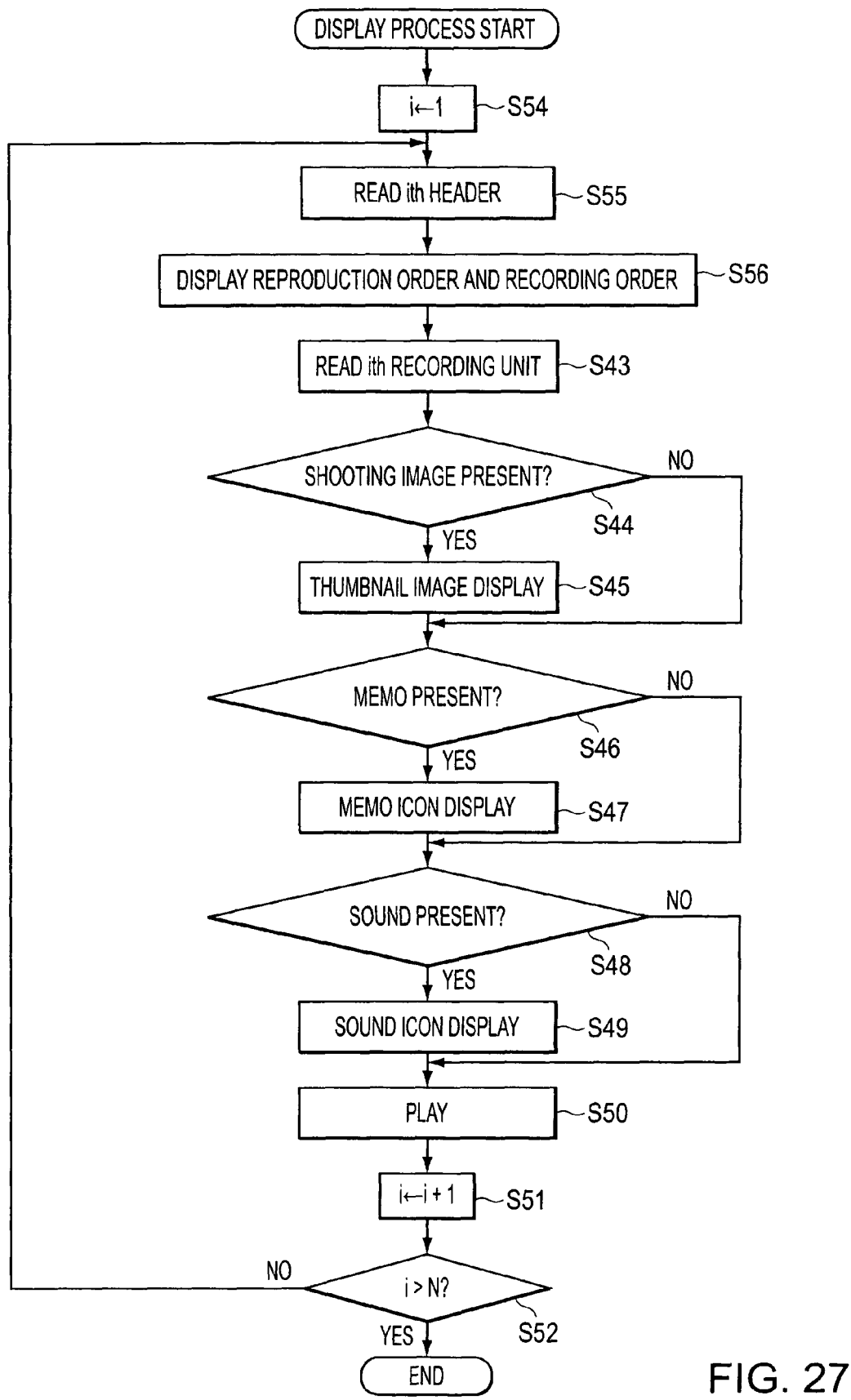
FIG. 27 is a flow chart showing the process in step S136 in FIG. 25 in accordance with the second embodiment of the invention.

When CPU 39 returns to FIG. 25, the process of step S136 is executed. Then, the display process is executed. The details of this process will be described hereinafter, with reference to FIG. 27. When the process of FIG. 27 is executed, the CPU 39 initializes the value of the variable in step S54. This variable stores the number of times the process is repeated to be 1. The CPU 39 then moves to step S55. In step S55, the CPU reads the header with the ith reproduction order from the headers that are generated at step S135 in FIG. 25 and stored in the memory card 24. The CPU then moves to step S56. In step S56, the CPU 39 causes the recording order and the reproduction order to be displayed on the screen LCD 6, as shown in FIG. 30. This is done, for example, by extracting the recording order 60B and the reproduction order 60C from the header which is read, and writing them into the predetermined area in the memory card 24.

In the next step S43, the CPU 39 reads the recording unit from the memory card 24 corresponding to the header having the ith reproduction order. In other words, the CPU 39 reads the shooting image, memo, or sound which has the same recording date as the recording date 60A, which is contained in the header. Then the CPU 39 moves to step S44. In step S44, the CPU 39 determines whether the recording unit which is read contains a shooting image. As a result, if the recording unit is determined not to contain a shooting image (NO), the CPU 39 moves to step S46. Also, if the recording unit is determined to contain the shooting image (YES), the CPU 39 moves to step S45.

In step S45, the CPU 39 generates a thumbnail image by thinning out or ignoring, at a predetermined ratio, pixels from the shooting image. Further, the CPU 39 causes the thumbnail image to be displayed on the screen LCD 6 as shown in FIG. 30. The CPU does this by writing the thumbnail image stored in the predetermined area of the memory card 24.

In step S46, the CPU 39 determines whether the recording unit contains a memo. As a result, if the recording unit is determined not to contain a memo (NO), the CPU 39 moves to step S48. Further, if the recording unit is determined to contain a memo (YES), the CPU 39 moves to step S47. In step S47, the CPU 39 causes the memo icon to be displayed on the screen LCD 6 as shown in FIG. 30, by writing the bit map data corresponding to the memo icon in the predetermined area of the memory card 24.

In the next step S48, the CPU 39 determines whether the recording unit contains sound. As a result, if the recording unit is determined not to contain sound (NO), the CPU 39 moves to step S50. Additionally, if the recording unit is determined to contain sound (YES), the CPU 39 moves to step S49.

In step S49, the CPU 39 causes the sound icon to be displayed on the screen LCD 6 as shown in FIG. 30 by writing the bit map data corresponding to the sound icon in the predetermined area of the memory card 24. Then the CPU 39 moves to step S50.

In step S50, the CPU 39 causes the reproduction time to be displayed on the screen LCD 6 as shown in FIG. 30 by extracting the PLAY (reproduction time) 60D from the header, and by writing the reproduction time extracted and the data corresponding to the parenthesis into the predetermined area in the memory card 24.

In step S51, the CPU 39 increments the value of the variable i which stores the number of the times the process is repeated and moves to step S52. Then in step S52, the CPU 39 determines whether the value of the variable i is larger than the number N of the recording units which composes the reproduction unit. As a result, if the value of the variable i is determined to have be smaller than or equal to N (NO), the CPU 39 returns to step S55 and repeats the same process as mentioned before. Additionally, if the value of the variable i is determined to be greater than N (YES), the CPU 39 returns to the process of step S137 in FIG. 25.

As a result of processes described above, screens such as those described in FIG. 30 will be displayed. The display screen is a display example of the screen which will be displayed when the slide show mode is selected while the information such as that described in FIG. 14 is recorded in the memory card 24. In other words, in the example of FIG. 14, the shooting images 1 through 3, memo 1 and the sound 1 through 3 are displayed. Additionally, the memo 1 and the sound 1 are the same recording unit, the sound 2, the shooting image 2 and the sound 3 are the same recording unit, and the memo 1 and the shooting image 3 are the same recording unit. In such a case, the screen to be displayed on the LCD 6 as a result of the process of step S136 becomes like that described in aforementioned FIG. 9.

In this display screen, the number displayed at the left edge of the screen represents reproduction order when the slide show is executed. The number which is displayed next to the right represents recording order of the recorded information. The memo icon, the thumbnail image, the sound icon, and reproduction time are displayed further next to the right, as in the case above explained with reference to FIG. 9.

Additionally the expression [REPEAT [1] CYCLE] displayed at the bottom of the screen represents the number of times (reproduction times) the slide show is repeated. In the case of the present example, all of the information is reproduced only once. If "2" is set as the reproduction time, the same reproduction is to be repeated after all of the designated information is reproduced.

The decrement keys 70, 71, and the increment keys 72, 73 which are displayed at the lower most of the screen are operated in changing the reproduction order and are made respectively to decrement (decrease) and to increment (increase) the value displayed on the screen. In this instance, the decrement key 71 and the increment key 72 are made to respectively decrease or increase the value by 1 while the decrement key 70 and the increment key 73 are made to respectively decrease or increase the value by 5. Additionally, the default key (dissolution means) is made to be operated when the aforementioned reproduction unit (the totality of the slide show data) is to be changed to the default state, the details of which will be described later.

Additionally, positive-negative reversal display, i.e., highlighting, of a certain "reproduction order" indicates that the reproduction process is to start from the highlighted reproduction order. The starting and the ending position of the reproduction process may be arbitrarily set. It is also possible to change the reproduction order of the information by changing the recording order.

Returning to FIG. 25, in step S137, CPU 39 determines, whether the execution key 7B is pressed. This is indicative of reproduction of slide show data generated using the process of step S135. As a result, if the execution key 7B is determined not to have been processed (NO), the CPU 39 returns to step S137 and repeats the same process as described above until the execution key 7B is pressed. However, if the execution key 7B is determined to have been pressed, the CPU 39 moves to step S138. In step S138, the reproduction process is executed. The details of this process are described hereinafter, with reference to FIG. 28.

Figure 28:
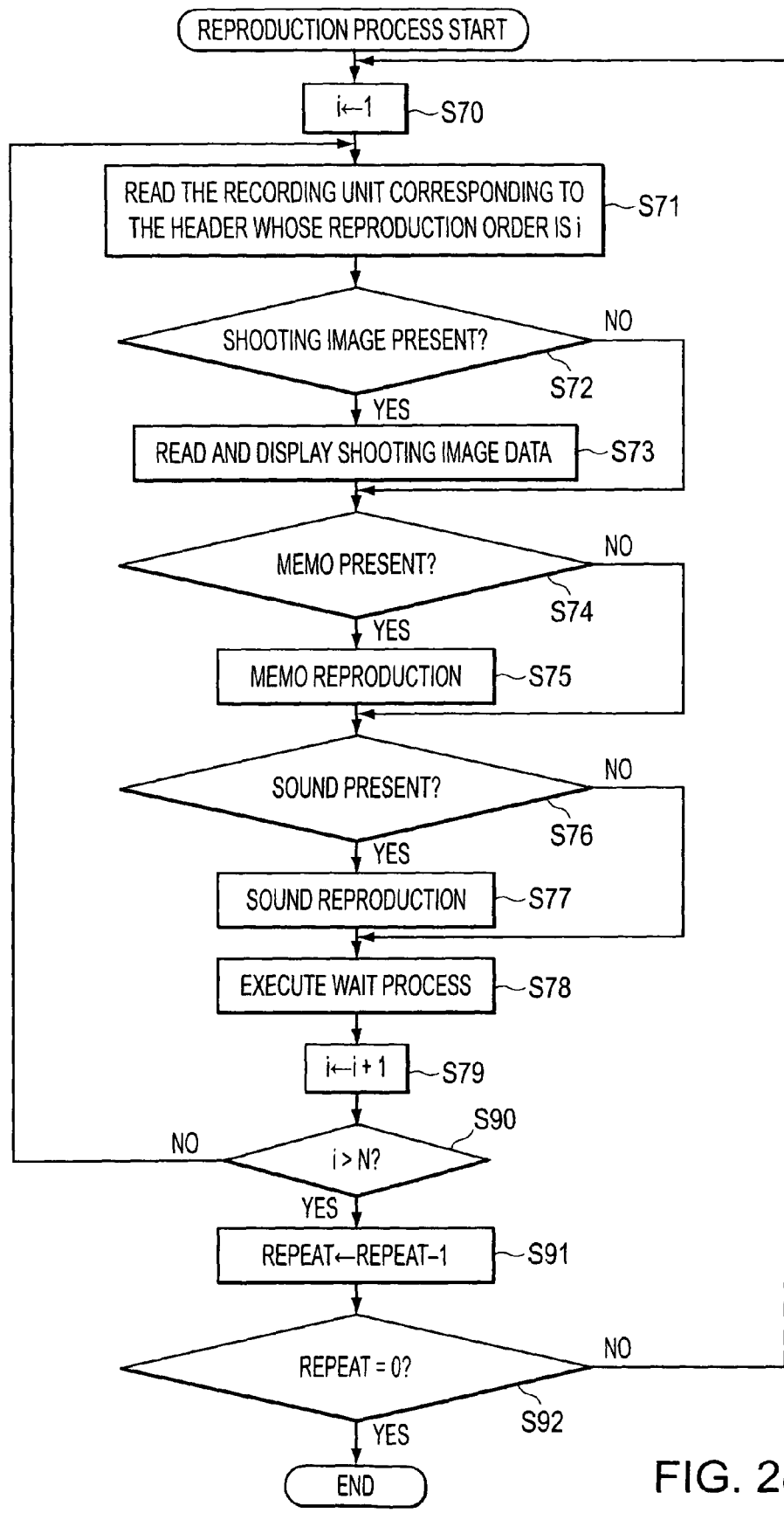
FIG. 28 is a flow chart showing the process in step S138 in FIG. 25 in accordance with the second embodiment of the invention.

Upon execution of step S138 in FIG. 25, the CPU goes to step S70 in FIG. 28. In step S70, the CPU initializes the value of the variable I, which stores the number of times the process is repeated. The CPU then and moves to step S71 in FIG. 28. In step S71, CPU 39 reads the header from the memory card 24 whose reproduction order is ith. The CPU then reads the recording unit associated with the header having the recording date 60A as illustrated, for example, in FIG. 29.

In step S72, the CPU 39 determines whether a shooting image is contained in the recording unit read in step S71. As a result, if a shooting image is determined not to be contained in the recording unit (NO), the CPU 39 moves to the process in step S74. However, if the shooting image is determined to be contained in the recording unit (YES), the CPU 39 moves to step S73. In step S73, the CPU 39 instructs DSP 33 to read from the memory card 24 the shooting image data contained in the recording unit. The DSP 33 decompresses the shooting image data (the compressed shooting image data) read from the memory card 24, and writes the shooting image data to the frame memory 35 as bit map data. The CPU also causes the shooting image data to be displayed on the LCD 6. Then the CPU 39 moves to step S74.

In step S74, the CPU 39 determines whether a memo is contained in the recording unit read in step S71. As a result, if the memo is determined not to be contained in the recording unit (NO), CPU 39 moves to the process in step S76. However, if the memo is determined to be contained in the recording unit (YES), the CPU 39 moves to step S75. In step S75, the CPU 39 reads the memo data contained in the recording unit from the memory card 24 and restores the original image by decompressing the compressed data using the run length method. The CPU further writes the reproduced data in the frame memory 35 as bit map data and causes the memo data to be displayed on LCD 6. The CPU 39 then moves to step S76.

In step S76, the CPU 39 determines whether sound is contained in the recording unit read in step S71. As a result, if sound is determined not to be contained in the recording unit (NO), the CPU 39 moves to the process in step S78. However, if sound is determined to be contained in the recording unit (YES), the CPU 39 moves to step S77. In step S77, the CPU 39 reads the sound data contained in the recording unit from the memory card 24 and decompresses the sound data. The CPU then supplies the sound data to the A/D and D/A conversion circuit 42. The A/D and D/A conversion circuit 42 converts the sound data supplied into analog signals and reproduces them using speaker 5. The CPU 39 then moves to step S78. In step S78, the wait process is executed. In other words, the CPU 39 extracts WAIT 60E from the header and counts the output from the timer 45 in relation to the WAIT value 60E. Further, the CPU 39 moves to step S79 if the predetermined time which is stored in WAIT 60E has elapsed.

In step S79, the CPU 39 increments the value of the variable i, which stores the number of times the process is repeated, by 1. The CPU then moves to step S90. In step S90, the CPU 39 determines whether the value of the variable i is larger than the number N of the recording units contained in the reproduction unit. As a result, if the value of the variable i is determined to be smaller than or equal to N (NO), which is the number of recording units contained in the reproduction unit, the CPU 39 returns to step S71 and repeats the same process as mentioned before. Further, if the value of the variable i is determined to be greater than N (YES), which is the number of recording units contained in the reproduction unit, the CPU 39 proceeds to the process of step S91. In step S91, the CPU 39 decrements the value of the variable Repeat by 1. This is the variable in which the repeat value displayed in the fifth line in FIG. 30 is stored. Thus, the number of times the slide show is repeated is stored. The CPU then moves to step S92. In step S92, the CPU 39 determines whether the value of the variable Repeat is 0. As a result, if the value of the variable Repeat is determined not to be 0 (NO), the CPU 39 returns to step S70 and repeats the same process as described above. If the value of the variable Repeat is determined to be 0(YES), the CPU 39 returns to the process of step S139 which is shown in FIG. 25. As a result of the processes described above, all of the recording units contained in the reproduction unit generated through the process of step S135 in FIG. 25 will be reproduced.

With further reference to FIG. 25, the CPU 39 initializes the value of the variable M in step S139. This variable stores the number of recording units that are newly recorded. The CPU 39 then moves to step S140 in FIG. 25.

In step S140, the CPU 39 determines whether a new recording unit is recorded. As a result, if a new recording unit is determined to have been recorded (YES), the CPU 39 moves to step S141 and increments the value of the variable M by 1. The CPU then moves to step S142. If the new recording unit is determined not to have been recorded (NO), the CPU 39 moves to the process of step S142. In step S142, the CPU 39 determines whether the slide show mode is selected. In other words, CPU 39 determines whether "slide show" is selected. Such selection is the third selection choice in the menu screen shown in (FIG. 12) and is displayed by operation of the menu key 7A. If the slide show is determined not to have been selected (NO), the CPU 39 returns to step S140 and repeats the process described above. However, if the slide show is determined to have been selected, the CPU 39 moves to step S143.

In step S143, CPU 39 determines whether the default key 74, shown in FIG. 30 is pressed. As a result, if the default key 74 is determined to have been pressed (YES), the CPU 39 moves to the process of step S144 and adds the number M of the newly recorded recording units to the variable N. The variable N stores the number of recording units contained in the reproduction unit. Then CPU 39 then returns to step S135 and repeats the same process as described above. However, if the default key 74 is determined not to have been pressed (NO) in step S143, the CPU 39 skips the process of step S144 and returns to step S135. The CPU then repeats the same process as described above.

Figure 31:
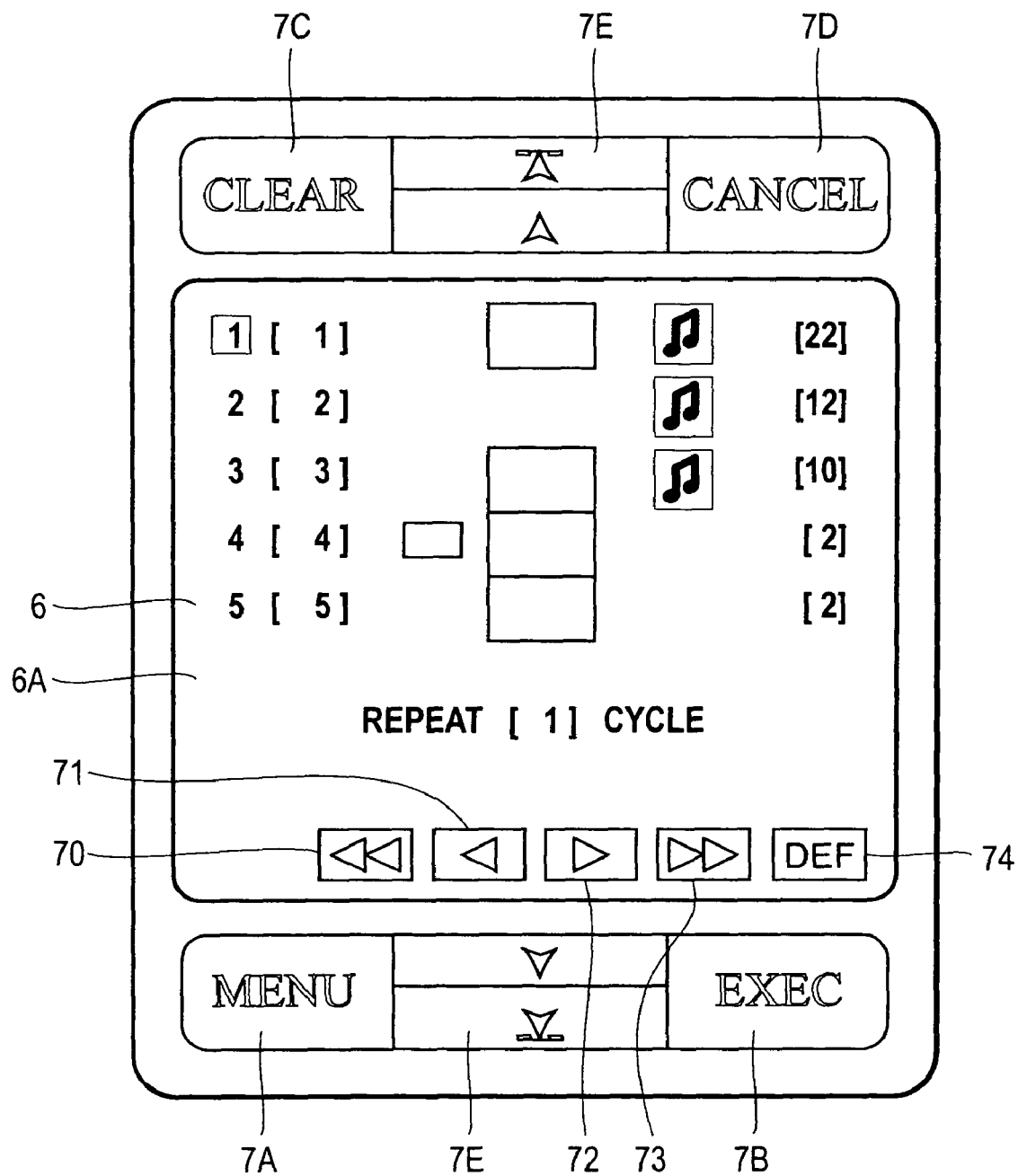
FIG. 31 shows an example of a display when a new image is photographed after the display shown in FIG. 30 in accordance with the second embodiment of the invention.

Illustratively, information such as that shown in FIG. 14 may be stored in the memory card 24, for example. If the slide show is executed, then the value 4 is assigned to the number N of the recording unit. Further, suppose one new shooting image is recorded later. In such a case, if a slide show is executed again without the default key 74 being pressed, the value N remains 4. Thus, the four recording units shown in FIG. 30 are reproduced successively following the reproduction order. Further, if a slide show is executed again after the default key 74 has been pressed, the determination in step S143, in FIG. 25, is (YES). Thus, the value of (M=1) is added to the value of N in step S144. This causes the newly photographed image to be displayed at the lower most row of the screen as shown in FIG. 31 during the display process of step S136. Thus, the newly photographed image may also be reproduced.

As a result of the process described above, if a new recording unit is recorded after the reproduction units are structured during the slide show mode, the newly recorded recording unit is processed in a different manner from the aforementioned reproduction units. Thus, the reproduction unit which is set during the slide show mode is maintained until the default key 74 is pressed. Therefore, even if a new recording is executed, the reproduction unit established during the slide show mode will not be changed.

Figure 32:
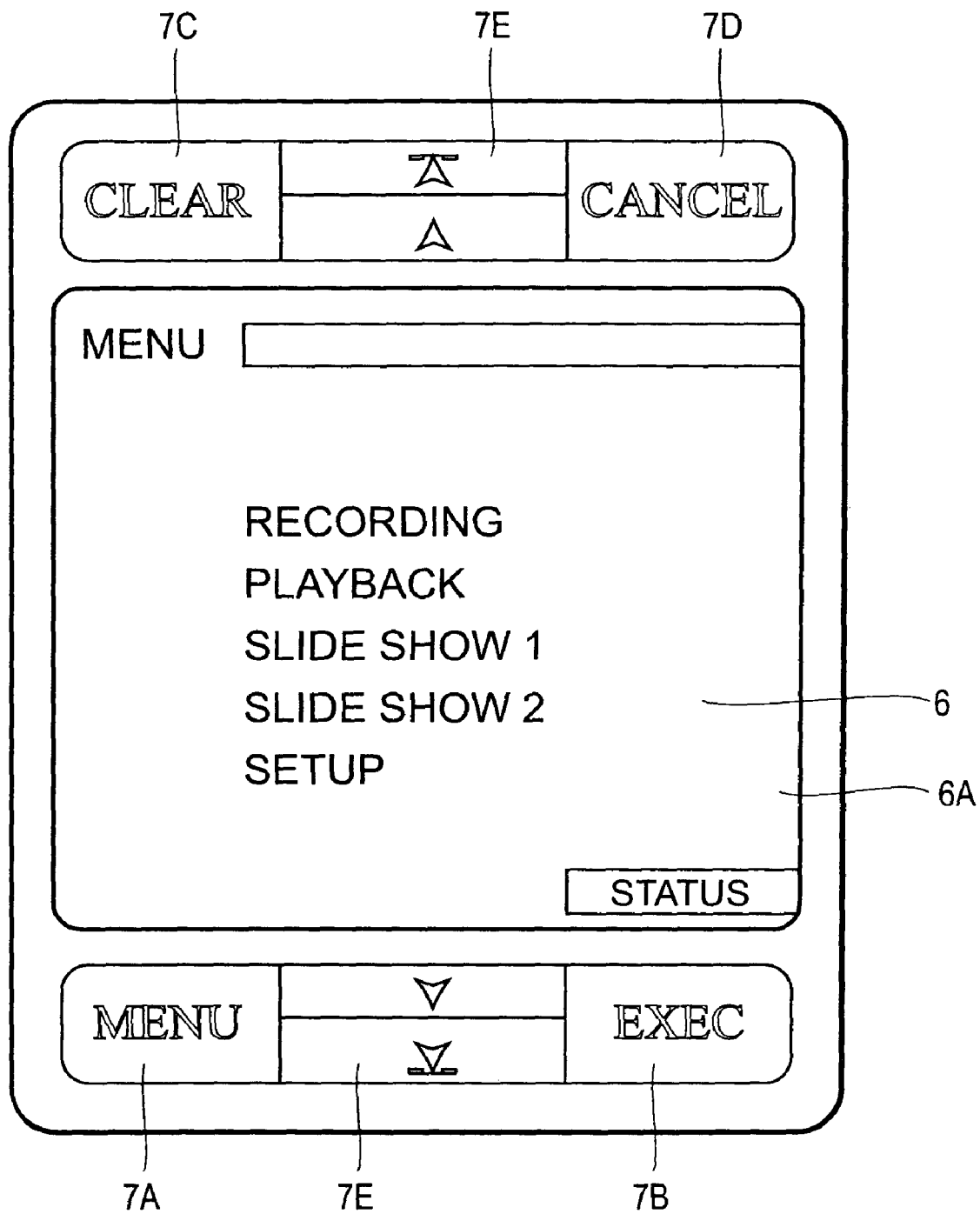
FIG. 32 shows another example of a display screen displayed when the menu key is operated in accordance with the second embodiment of the invention.

In the embodiment of the invention described above, the number of reproduction units is one. However, a plurality of reproduction units (or groups), for example, may be provided so as to allow generation thereof. In addition, a plurality of slide shows may be selected in the menu screen as shown in FIG. 32. In this example, the slide show 1 is displayed as the third display choice and the slide show 2 is displayed as the fourth display choice. In such a display screen, selection of a desired slide show enables the successive reproduction of the recording units which are contained in the reproduction unit corresponding to the selected slide show. In addition, the programs shown in FIGS. 16, 18, 19 and 22-28 are stored in the memory card 24. At such location, the programs are at the user's disposal. Also, the programs may be stored a in CD-ROM (Compact Disk-ROM) and in turn copied onto the memory card 24. The programs also can be stored in internal (non-removable) ROM of the camera. The programs also can be supplied over a communications network such as the Internet (World Wide Web).

Although the JPEG and run length encoding compression techniques were described, other compression techniques (or no compression at all) can be used with the invention.

Although a touch tablet with input pen were described as structures through which selections and commands can be input, the invention is not limited to such structure. For example, the touch tablet can be actuable by the user's finger. Additionally, selections and commands can be input without using a touch tablet. For example, a cursor can be moved (e.g., via a mouse) and selections or commands can be made by clicking.

The invention is not limited to implementation by a programmed general purpose computer as shown in the preferred embodiment. For example, the invention can be implemented using one or more special purpose integrated circuit(s) (e.g., ASIC). It will be appreciated by those skilled in the art that the invention can also be implemented using one or more dedicated or programmable integrated or other electronic circuits or devices (e.g., hardwired electronic or logic circuits such as discrete element circuits, or programmable logic devices such as PLDs, PLAs, PALs or the like). In general, any device or assembly of devices on which a finite state machine capable of implementing the flow charts shown in FIGS. 16, 18, 19 and 22-28 can be used.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An information processing apparatus that reproduces information stored as recording units, each recording unit including at least one of image information, memo information and sound information, the information processing apparatus comprising:

storage means for storing the recording units;

recording unit selection means for selecting at least one recording unit from among the recording units stored in the storage means;

reproduction order setting means for setting a reproduction order of a plurality of the recording units selected by the recording unit selection means;

reproduction time setting means for setting a reproduction time for each of the recording units set by the reproduction order setting means, the reproduction time setting means setting the reproduction time based on a recording time of the sound information when the sound information is included in the recording unit and setting a predetermined constant time as the reproduction time when the sound information is not included in the recording unit;

reading means for reading the recording units from the storage means based on the order set by the reproduction order setting means; and reproduction means for reproducing information contained in each recording unit read by the reading means, in accordance with the reproduction time set by the reproduction time setting means.

2. The information processing apparatus according to claim 1, further comprising an information selection means for selecting the information to be reproduced from all the information contained in each recording unit selected by the recording unit selection means; and wherein the reproduction means selects only information selected by the information selection means from among all the information contained in each selected recording unit.

3. The information processing apparatus according to claim 1, further comprising changing means for changing the reproduction time set by the reproduction time setting means.

4. The information processing apparatus according to claim 1, wherein when the image information includes multiple frames of continuously photographed images, the reproduction time setting means sets the reproduction time of each frame based on frame rate at the time of shooting.

5. The information processing apparatus according to claim 1, wherein the image information includes multiple frames of continuously photographed images, the apparatus further comprising frame selection means for selecting at least a predetermined frame to be reproduced from the continuously photographed images.

6. The information processing apparatus according to claim 5, wherein the frame selection means selects all the frames of the continuously photographed images when the continuously photographed images include sound information.

7. The information processing apparatus according to claim 5, wherein when the images that are continuously photographed include sound information and there is at least one frame that is not selected by the frame selection means, the reproduction means reproduces a frame which either proceeds or follows the at least one frame which is not selected in place of the frame which is not selected.

8. The information processing apparatus according to claim 5, wherein when the images that are continuously photographed include sound information and there is at least one frame that is not selected by the frame selection means, the reproduction means does not reproduce a frame but reproduces only sound in place of the frame which is not selected.

9. The information processing apparatus according to claim 1, further comprising:

generation means for generating a reproduction group including at least one of the recording units;

setting means for setting a reproduction order of each recording unit contained in the reproduction group;

designation means for designating a desired reproduction group;

wherein the reproduction means reproduces each recording unit contained in the reproduction group designated by the designation means, the reproduction means reproducing each recording unit based on the reproduction order set by the setting means; and further comprising prohibition means for prohibiting reproduction of recording units that are not contained in the reproduction group designated by the designation means.

10. The information processing apparatus according to claim 9, further comprising resetting means for resetting the reproduction group generated by the generation means.

11. The information processing apparatus according to claim 9, further comprising dissolution means for dissolving the reproduction group generated by the generation means.

12. The information processing apparatus according to claim 11, wherein the reproduction means reproduces the recording units based on the order in which the recording units were recorded when all the reproduction groups are dissolved by said dissolution means.

13. An information processing apparatus comprising:
a memory that stores recording units, each recording unit including at least one of image information, memo information and sound information;
a recording unit selector that selects at least one recording unit from among the recording units stored in the memory;
a reproduction order setting device that sets a reproduction order of a plurality of the recording units selected by the recording unit selector; and
a controller coupled to the memory, the recording unit selector and to the reproduction order setting device to set a reproduction time for each of the recording units set by the reproduction order setting device, the controller setting the reproduction time based on a recording time of the sound information when the sound information is included in the recording unit and setting a predetermined constant time as the reproduction time when the sound information is not included in the recording unit, the controller also controlling reading of the recording units from the memory based on the order set by the reproduction order setting device and reproduction of the information contained in each recording unit in accordance with the set reproduction time.

14. The information processing apparatus according to claim 13, further comprising an information selector coupled to the controller to select the information to be reproduced from all the information contained in each recording unit selected by the recording unit selector; and wherein
the controller reproduces only information selected by the information selector from among all the information contained in each selected recording unit.

15. The information processing apparatus according to claim 13, further comprising a changing device coupled to the controller to change the reproduction time set by the controller.

16. The information processing apparatus according to claim 13, wherein the apparatus is a digital camera.

17. The information processing apparatus according to claim 16, wherein the digital camera includes:
a photoelectric converter through which the image information is input to the memory;
a touch tablet through which the memo information is input to the memory; and
at least one microphone through which the sound information is input to the memory.

18. The information processing apparatus according to claim 13, further comprising:
a reproduction group generator that generates at least one reproduction group including at least one of the recording units;
a setting device that sets a reproduction order of each recording unit contained in the at least one reproduction group;
a designator that designates a desired reproduction group; and
wherein the controller is coupled to the reproduction group generator, the setting device and to the designator, and the controller reproduces each recording unit contained in the reproduction group designated by the designator, the controller reproducing each recording unit based on the set reproduction order, and prohibiting reproduction of recording units that are not contained in the designated reproduction group.

19. The information processing apparatus according to claim 18, further comprising a resetting device coupled to the controller to reset the at least one reproduction group generated by the reproduction group generator.

20. The information processing apparatus according to claim 18, further comprising a dissolution command device coupled to the controller to dissolve the reproduction group generated by the controller.

21. The information processing apparatus according to claim 20, wherein the controller reproduces the recording units based on the order in which the recording units were recorded when all the reproduction groups have been dissolved.

22. A method of controlling an information processing apparatus that reproduces information stored as recording units, each recording unit including at least one of image information, memo information and sound information, the method comprising the steps of:
selecting at least one recording unit from among a plurality of recording units stored in memory;
setting a reproduction order of a plurality of the selected recording units;
setting a reproduction time for each of the selected and ordered recording units, the reproduction time being set based on a recording time of the sound information when the sound information is included in the recording unit and being set as a predetermined constant time when the sound information is not included in the recording unit;
reading the recording units from the memory based on the set reproduction order; and
reproducing information contained in each recording unit, in accordance with the set reproduction time.

23. The method according to claim 22, further comprising:
selecting the information to be reproduced from all the information contained in each selected recording unit; and wherein
the reproducing step reproduces only the selected information from among all the information contained in each selected recording unit.

24. The method according to claim 22, wherein when the image information includes multiple frames of continuously photographed images, the reproduction time setting step includes setting the reproduction time of each frame based on frame rate at the time of shooting.

25. The method according to claim 22, wherein when the image information includes multiple frames of continuously photographed images, further comprising the step of selecting at least a predetermined frame to be reproduced from the continuously photographed images.

26. The method according to claim 25, wherein the frame selecting step selects all the frames of the continuously photographed images when the continuously photographed images include sound information.

27. The method according to claim 25, wherein when the images that are continuously photographed include sound information and there is at least one frame that is not selected by the frame selecting step, the reproducing step reproduces a frame which either proceeds or follows the at least one frame which is not selected in place of the frame which is not selected.

28. The method according to claim 25, wherein when the images that are continuously photographed include sound information and there is at least one frame that is not selected in the frame selecting step, the reproducing step does not reproduce a frame but reproduces only sound in place of the frame which is not selected 29. The method according to claim 22, further comprising the steps of:
generating at least one reproduction group including at least one of the recording units;
setting a reproduction order of each recording unit contained in the at least one reproduction group;
designating a desired reproduction group;
wherein the reproducing step includes reproducing each recording unit contained in the designated reproduction group based on the set reproduction order; and
prohibiting reproduction of recording units that are not contained in the designated reproduction group.

30. The method according to claim 29, further comprising resetting the contents of the generated reproduction group.

31. The method according to claim 29, further comprising dissolving the generated reproduction group.

32. The method according to claim 31, wherein the reproducing step reproduces the recording units based on the order in which the recording units were recorded when all the reproduction groups are dissolved.

33. A non-transitory recording medium that stores a computer-readable control program having instructions that are executable by a controller of an information processing apparatus that reproduces information stored as recording units, each recording unit including at least one of image information, memo information and sound information, to perform the steps of:
selecting at least one recording unit from among a plurality of recording units stored in memory;
setting a reproduction order of a plurality of the selected recording units;
setting a reproduction time for each of the selected and ordered recording units, the reproduction time being set based on a recording time of the sound information when the sound information is included in the recording unit and being set as a predetermined constant time when the sound information is not included in the recording unit;
reading the recording units from the memory based on the set reproduction order; and
reproducing information contained in each recording unit, in accordance with the set reproduction time.

34. The non-transitory recording medium according to claim 33, wherein the instructions further cause the information processing apparatus to perform the steps of:
generating at least one reproduction group including at least one of the recording units;
setting a reproduction order of each recording unit contained in the at least one reproduction group;
designating a desired reproduction group;
the reproducing includes reproducing each recording unit contained in the designated reproduction group based on the set reproduction order; and
prohibiting reproduction of recording units that are not contained in the designated reproduction group.

35. The information processing apparatus according to claim 1, wherein the reproduction time setting means sets the predetermined constant time as the reproduction time for each of the recording units that does not include sound information.

36. The information processing apparatus according to claim 13, wherein the controller sets the predetermined constant time as the reproduction time for each of the recording units that does not include sound information.

37. The method according to claim 22, wherein the predetermined constant time is set as the reproduction time for each of the recording units that does not include sound information.

38. The non-transitory recording medium according to claim 33, wherein the predetermined constant time is set as the reproduction time for each of the recording units that does not include sound information.

* * * * *